US012559212B1

(12) United States Patent　　　　　(10) Patent No.:　US 12,559,212 B1

Carvalho-Ruehle et al.　　　　　　　(45) Date of Patent:　　Feb. 24, 2026

(54) SYSTEM AND METHOD FOR CONTROLLING DOCKING FOR A MARINE VESSEL

(71) Applicant: Brunswick Corporation, Mettawa, IL (US)

(72) Inventors: Raissa Carvalho-Ruehle, Charlotte, MI (US); Anna R. Chi, Lisle, IL (US); Lauren A. McLeod, Gainesville, FL (US)

(73) Assignee: Brunswick Corporation, Mettawa, IL (US)

( * ) Notice: Subject to any disclaimer, the term of this patent is extended or adjusted under 35 U.S.C. 154(b) by 125 days.

(21) Appl. No.: 18/468,289

(22) Filed: Sep. 15, 2023

(51) Int. Cl.
| | |
|---|---|
| *B63B 79/40* | (2020.01) |
| *B63B 49/00* | (2006.01) |
| *G06T 7/73* | (2017.01) |
| *G06V 10/94* | (2022.01) |
| *G06V 20/50* | (2022.01) |

(52) U.S. Cl.
CPC .............. *B63B 79/40* (2020.01); *B63B 49/00* (2013.01); *G06T 7/73* (2017.01); *G06V 10/945* (2022.01); *G06V 20/50* (2022.01); *G06T 2200/24* (2013.01); *G06T 2207/20104* (2013.01)

(58) Field of Classification Search
CPC ........... B63B 79/40; B63B 49/00; G06T 7/73; G06T 2200/24; G06T 2207/20104; G06V 20/50; G06V 10/945
See application file for complete search history.

(56)　　　　　References Cited

U.S. PATENT DOCUMENTS

| | | |
|---|---|---|
| 7,561,886 B1 | 7/2009 | Gonring et al. |
| 10,053,193 B2 | 8/2018 | Nachem |
| 10,259,555 B2 | 4/2019 | Ward et al. |
| 10,322,787 B2 | 6/2019 | Ward |
| 10,429,845 B2 | 10/2019 | Arbuckle et al. |
| 11,257,378 B2 | 2/2022 | Derginer et al. |
| 11,403,955 B2 | 8/2022 | Derginer et al. |
| 11,702,178 B2 | 7/2023 | Dannenberg et al. |
| 2017/0227639 A1 | 8/2017 | Stokes et al. |
| 2017/0253314 A1 | 9/2017 | Ward |
| 2019/0361457 A1 | 11/2019 | Johnson et al. |
| 2021/0070407 A1* | 3/2021 | Ishii ........................ B63B 79/10 |
| 2022/0291688 A1 | 9/2022 | Afman et al. |

FOREIGN PATENT DOCUMENTS

WO　　　　2018232376 A1　　12/2018

* cited by examiner

*Primary Examiner* — Michael D Lang
(74) *Attorney, Agent, or Firm* — Andrus Intellectual Property Law, LLP

(57)　　　　　ABSTRACT

A method of controlling docking for a marine vessel includes imaging an area around a marine vessel with an imaging system to generate image data, generating a display of a docking area on a user interface based on the image data, receiving a user input selecting a location on the display of the docking area, identifying a selected docking location based on the selected location on the display and based on at least one dimension of the marine vessel, and updating the display of the docking area to represent the marine vessel docked at the selected docking location.

20 Claims, 15 Drawing Sheets

IMAGE AN AREA AROUND THE MARINE VESSEL ⟍1005

GENERATE A DISPLAY OF A DOCKING AREA ON A USER INTERFACE ⟍1010

RECEIVE USER INPUT SELECTING A LOCATION ON THE DISPLAY ⟍1015

IDENTIFY A SELECTED DOCKING LOCATION BASED ON THE USER INPUT ON THE DISPLAY AND AT LEAST ONE DIMENSION OF THE MARINE VESSEL ⟍1020

UPDATE THE DISPLAY OF THE DOCKING AREA ⟍1025

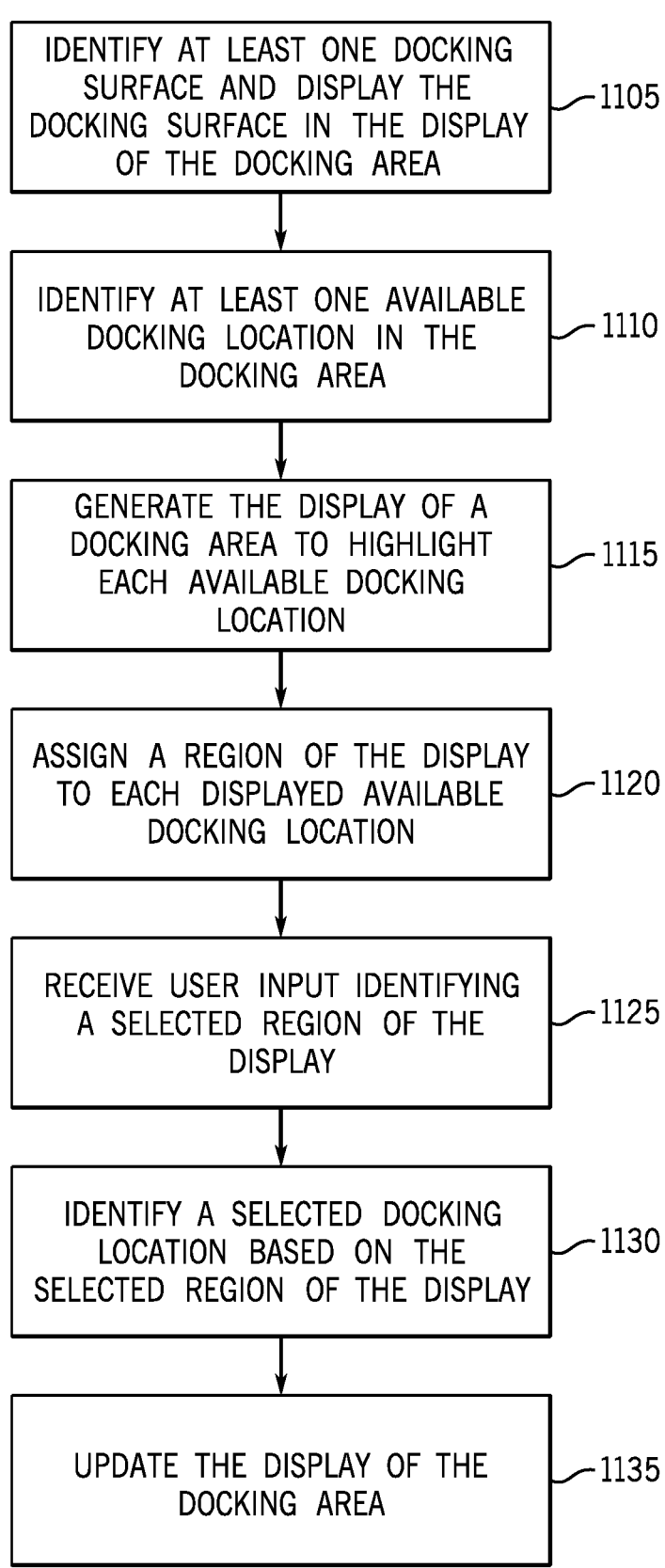

IDENTIFY AT LEAST ONE DOCKING SURFACE AND DISPLAY THE DOCKING SURFACE IN THE DISPLAY OF THE DOCKING AREA —1105

IDENTIFY AT LEAST ONE AVAILABLE DOCKING LOCATION IN THE DOCKING AREA —1110

GENERATE THE DISPLAY OF A DOCKING AREA TO HIGHLIGHT EACH AVAILABLE DOCKING LOCATION —1115

ASSIGN A REGION OF THE DISPLAY TO EACH DISPLAYED AVAILABLE DOCKING LOCATION —1120

RECEIVE USER INPUT IDENTIFYING A SELECTED REGION OF THE DISPLAY —1125

IDENTIFY A SELECTED DOCKING LOCATION BASED ON THE SELECTED REGION OF THE DISPLAY —1130

UPDATE THE DISPLAY OF THE DOCKING AREA —1135

FIG. 11

SYSTEM AND METHOD FOR CONTROLLING DOCKING FOR A MARINE VESSEL

FIELD

The present disclosure generally relates to systems and methods of controlling docking for a marine vessel, including autonomous and semi-autonomous docking controls.

BACKGROUND

The following U.S. Patents and publications provide background information and are incorporated herein by reference, each in its entirety:

U.S. Pat. No. 7,561,886 discloses a method by which a position of a marine vessel can be determined relative to a stationary object, such as a dock. Two position sensors are attached to a marine vessel and a microprocessor, onboard the marine vessel, computes various distances and angular relationships between the position sensors on the marine vessel and stationary transponders attached to the fixed device, such as a dock. The various dimensions and angular relationships allow a complete determination regarding the location and attitude of a marine vessel relative to the dock. This information can then be used by a maneuvering program to cause the marine vessel to be berthed at a position proximate the dock.

U.S. Pat. No. 10,322,787 discloses a system for maintaining a marine vessel in a body of water at a selected position and orientation that includes a global positioning system that determines a global position and heading of the vessel and a proximity sensor that determines a relative position and bearing of the vessel with respect to an object near the vessel. A controller operable in a station keeping mode is in signal communication with the GPS and the proximity sensor. The controller chooses between using global position and heading data from the GPS and relative position and bearing data from the proximity sensor to determine if the vessel has moved from the selected position and orientation. The controller calculates thrust commands required to return the vessel to the selected position and orientation and outputs the thrust commands to a marine propulsion system, which uses the thrust commands to reposition the vessel.

U.S. Pat. No. 11,257,378 discloses a method of controlling a propulsion system on a marine vessel that includes receiving proximity measurements describing locations of one or more objects with respect to the marine vessel, receiving a command vector instructing magnitude and direction for propulsion of the marine vessel with respect to a point of navigation for the marine vessel, and then determining a funnel boundary based on the command vector. An object is identified based on the proximity measurements and determined to be within the funnel boundary, and then a propulsion adjustment command is calculated based on the command vector and an angle of the object with respect to the point of navigation. At least one propulsion device is then controlled based on the propulsion adjustment command in order to avoid the object.

U.S. Pat. No. 11,403,955 discloses a propulsion control system on a marine vessel that includes at least one propulsion device configured to propel the marine vessel and at least one proximity sensor system configured to generate proximity measurements describing a proximity of an object with respect to the marine vessel. The system further includes a controller configured to receive proximity measurements, access a preset buffer distance, and calculate a velocity limit in a direction of the object for the marine vessel based on the proximity measurements and the preset buffer distance so as to progressively decrease the velocity limit as the marine vessel approaches the preset buffer distance from the object.

U.S. Pat. No. 11,702,178 discloses a marine propulsion system that includes at least one propulsion device and a user input device configured to facilitate input for engaging automatic propulsion control functionality with respect to a docking surface, wherein the user input device includes a direction indicator display configured to visually indicate a direction with respect to the marine vessel. A controller is configured to identify a potential docking surface, determine a direction of the potential docking surface with respect to the marine vessel, and control the direction indicator display to indicate the direction of the potential docking surface with respect to the marine vessel. When a user selection is received via the user input device to select the potential docking surface as a selected docking surface, and propulsion of the marine vessel is automatically controlled by controlling the at least one propulsion device to move the marine vessel with respect to the selected docking surface.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one aspect of the disclosure, a method of controlling docking for a marine vessel includes imaging an area around the marine vessel with an imaging system to generate image data, generating a display of a docking area on a user interface based on the image data, receiving a user input selecting a location on the display of the docking area, identifying a selected docking location based on the selected location on the display and based on at least one dimension of the marine vessel, and updating the display of the docking area to represent the marine vessel docked at the selected docking location.

In one embodiment, the method of controlling docking for a marine vessel may include identifying at least one available docking location in the docking area based on the image data and the at least one dimension of the marine vessel, generating the display of the docking area to highlight each of the at least one available docking location for selection by a user, assigning a region of the display to each of the at least one available docking location, receiving a user input identifying a selected region of the display, and wherein the selected docking location is the at least one available docking location associated with the selected region of the display.

In another embodiment, the method includes identifying the selected docking location which includes locating a closest available docking surface to the location on the display selected by the user.

In another embodiment, the method includes identifying at least one docking surface based on the image data and displaying the at least one docking surface in the display of the docking area, wherein identifying at least one docking surface includes identifying, with a control system, a dock and/or a set of pilings in a straight line based on the image data.

In another embodiment, the method includes identifying at least one docking surface based on the image data and displaying the docking surface in the display of the docking area, wherein identifying the at least one docking surface includes identifying, with a control system, a straight line of at least a threshold length in the image data. In another embodiment, the threshold length is greater than a length of a docking side of the marine vessel.

In another embodiment, the method may, with a control system, identify a dock type and determine a default vessel orientation based on the dock type, and identify the selected docking location based further on the default vessel orientation.

In another embodiment, the method includes upon updating the display of the docking area to represent the marine vessel docked at the selected docking location, prompting a user to confirm or adjust the selected docking location. In another embodiment, the method includes receiving a user input instructing an adjustment direction and moving the selected docking location in response to receiving the user input instructing the adjustment direction. Optionally, the selected docking location is moved by a predetermined amount in a direction corresponding to the adjustment direction.

In another embodiment, the method may include prompting the user to select a docking side of the marine vessel, identifying the selected docking location based further on the selected docking side, wherein the at least one dimension of the marine vessel is a length of the selected docking side.

In another embodiment, the method may include identifying a target docking location to dock the marine vessel based on the selected docking location, and automatically controlling at least one marine drive on the marine vessel to move the marine vessel toward the target docking location.

In another aspect of the disclosure, a docking system includes an imaging system configured to image an area around the marine vessel to generate image data and a control system. The control system is configured to image an area around the marine vessel with an imaging system, generate a display of a docking area on a user interface based on the image data, receive a user input selecting a location on the display of the docking area, identify a selected docking location based on the selected location on the display and based on at least one dimension of the marine vessel, and update the display of the docking area to represent the marine vessel docked at the selected docking location.

In one embodiment, the control system is further configured to identify at least one docking surface by identifying a straight line of at least a threshold length based the image data, wherein the threshold length is greater than a length of a docking side of the marine vessel.

In another embodiment, the control system is further configured to identify at least one docking surface based on the image data, identify a dock type based on the image data for each identified docking surface, determine a default vessel orientation based on the dock type, and identify the selected docking location based further on the default vessel orientation.

In another embodiment, the control system is further configured to, upon updating the display of the docking area to represent the marine vessel docked at the selected docking location, prompt a user to confirm or adjust the selected docking location.

In embodiments where the user desires to adjust the selected docking location, the control system may be further configured to receive a user input instructing an adjustment direction, and in response to receiving the user input instructing the adjustment direction, move the selected docking location accordingly.

In another embodiment, the control system is further configured to prompt a user to input a clearance distance behind and/or in front of the marine vessel and/or prompt the user to select a docking side of the marine vessel, and identify the selected docking location based further on the clearance distance and/or identify the selected docking location based further on the selected docking side, wherein the at least one dimension of the marine vessel is a length of the selected docking side.

BRIEF DESCRIPTION OF THE DRAWINGS

The present disclosure includes the following Figures.

FIGS. 10-12 illustrate exemplary methods for controlling docking in accordance with embodiments of the present disclosure.

DETAILED DESCRIPTION

Figure 1:
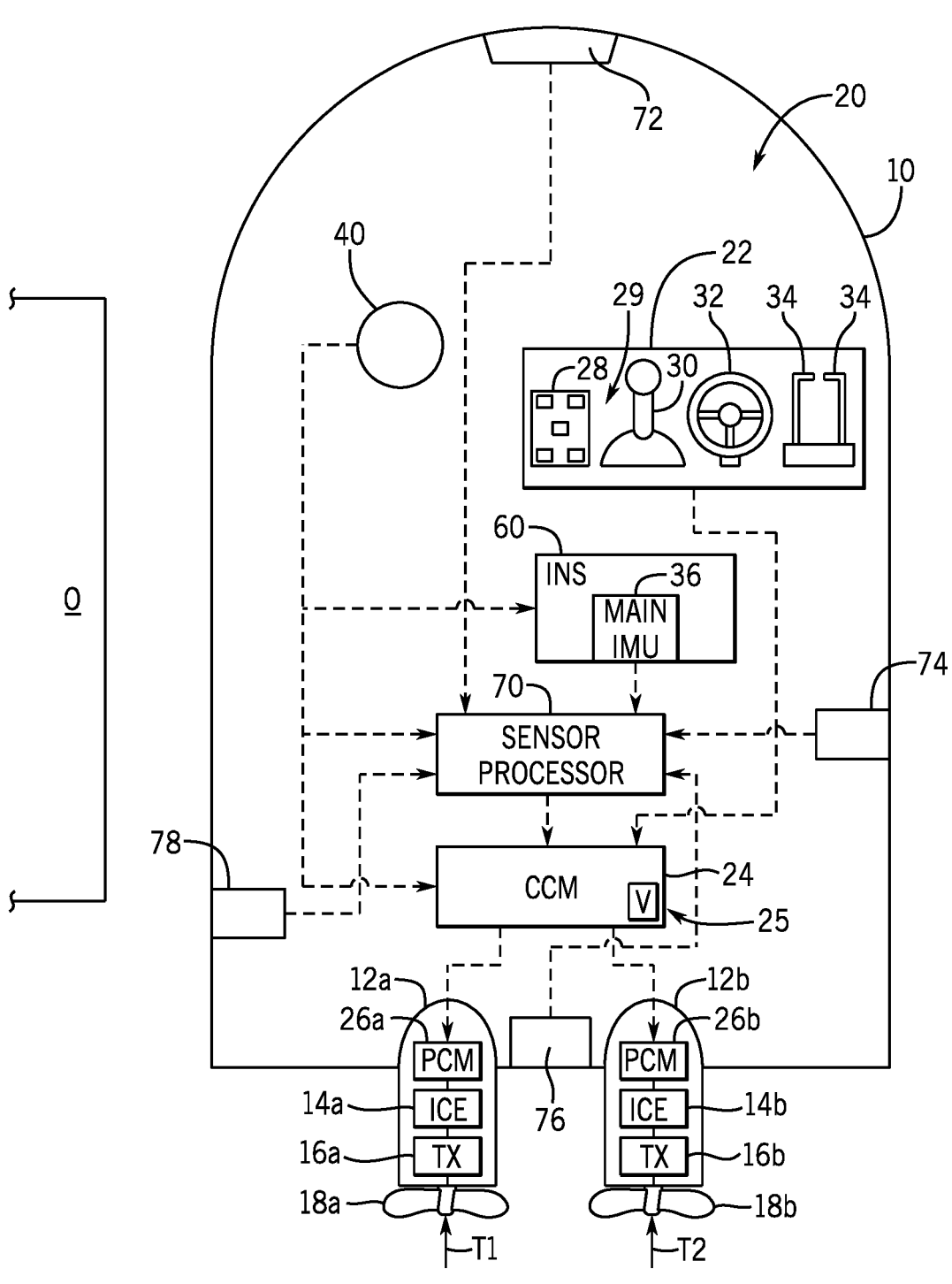
FIG. 1 is a schematic representation of an exemplary propulsion system on a marine vessel according to one embodiment of the present disclosure.

The present disclosure relates to marine vessel navigation and docking, including autonomous navigation. The inventors have recognized that, when people are planning on docking a marine vessel, they will often seek to dock next to a structure that can be used to secure the marine vessel while it is docked. Furthermore, the inventors have recognized that systems and vessel control methods are needed that visually identify available docking locations, docking surfaces, and nearby docking structures in a docking area in a way that is easily understood and selectable by a user. Furthermore, the inventors recognized that docking user interface systems and methods for docking need to be easy for an operator to use in marine conditions, including when the vessel is rocking and rolling in large waves or windy conditions. Additionally, vessel motion, harsh lighting, and weather conditions such as precipitation can make it difficult to see and interpret displays at the helm, which often show a large amount of information in a small area.

Given those challenges, the inventors developed the disclosed system to provide driver assistance and/or automated control functionality to properly identify available docking locations and facilitate user selection of the identified available docking locations and fine-tuning the selection to define a target docking location, even in harsh and moving marine conditions. To this end, the docking control system provides a selectable display of the docking area and its available docking locations and/or docking surfaces identified in the image data collected by the imaging system. The control system is configured to identify and display available docking locations in a way that is easily interpreted and selectable by a user, and to identify user selection based on proximity to a displayed available docking location without needing a user's input to be precise or for users to spend copious amounts of time trying to perfect inputs or mess with details to align the side of the marine vessel to the target docking location precisely enough to be effective.

The user interface display may provide a plurality of selectable regions of the display that correlate to the identified available docking locations and/or docking surfaces. Selections of an available docking location and/or a docking surface may determine the location and orientation of the marine vessel when docked. Upon selection, the control system may prompt the user to input adjustments, such as by presenting a set of individually-selectable adjustment indicators, and/or to confirm whether the selected docking location is desired as the target location for docking. The user may input an adjustment direction and adjust the position and orientation of the selected docking location by an incremental predetermined amount until the position of the marine vessel is satisfactory. Upon receiving user input selecting a confirmation indicator, the selected docking location is set as the target docking location, which is the navigational target that the marine vessel will navigate towards for autonomous or semi-autonomous docking control. In various embodiments, the user may authorize the selected docking location and execute docking instructions, or they may approve it and the system automatically docks or makes the adjustments.

FIG. 1 shows a marine vessel 10 equipped with a propulsion system 20 configured according to one embodiment of the disclosure. The propulsion system 20 is capable of operating, for example, in a joysticking mode where a joystick is operated by an operator to control vessel movement within an x/y plane, among other modes, as described hereinbelow. The propulsion system 20 has first and second marine drives 12a, 12b that produce first and second thrusts T1, T2 to propel the vessel 10. The first and second marine drives 12a, 12b are illustrated as outboard motors, but they could alternatively be inboard motors, stem drives, jet drives, or pod drives. In one embodiment, each marine drive 12a, 12b is provided with a powerhead, such as an engine 14a, 14b, operatively connected to a transmission 16a, 16b, in turn, operatively connected to a propeller 18a, 18b. In other embodiments, the powerhead may be an electric motor (e.g., powered by a battery or other power storage system) or a hybrid system comprising one or more of an electric motor and an internal combustion engine configured to initiate rotation of the propeller 18a, 18b.

The vessel 10 also houses various control elements that comprise part of the control system 25 for the propulsion system 20. The control system 25 comprises one or more controllers communicatively connected, and an operation console 22 in signal communication therewith, for example via a communication bus such as a CAN bus arrangement as described in U.S. Pat. No. 6,273,771. The one or more controllers of the control system 25 may comprise multiple hardware control devices communicatively connected, each including a hardware processor, such as for example a central controller 24 (e.g., shown as a command control module (CCM)) and/or propulsion control modules (PCM) 26a, 26b associated with the respective marine drives 12a, 12b. Each controller in the control system 25, such as controller 24 and the PCMs 26a, 26b, may include a memory and a programmable processor. As is conventional, each controller 24, 26a, 26b includes a processor communicatively connected to a storage system comprising a computer-readable medium that includes volatile or nonvolatile memory upon which computer-readable code and data are stored. The processor can access the computer-readable code and, upon executing the code, carry out functions, such as the navigation control functions and/or the proximity sensing functions, as described in detail below.

The control system 25 may further include one or more sensor processors 70, such as image processors configured to process the image data from the one or more image sensors 72-78. Given the large amount of image data produced by the image sensors 72-78, the connection between the sensors 72-78 and the sensor processor 70 may be via a dedicated bus or network connection. This dedicated bus or network connection is separate from the vessel network to allow transmission of a large amount of proximity measurement data (and, in some embodiments, IMU data) to the sensor processor 70. Such data transmission may not be possible on a typical vessel network, such as a CAN bus or wireless network where multiple devices are communicating. In still other embodiments, a dedicated communication link may be provided between the sensor processor 70 and the propulsion controller, such as the central controller 24.

The operation console 22 includes a number of user input devices, such as a keypad 28, a joystick 30, a steering wheel 32, and one or more throttle/shift levers 34. The operation console 22 may further include an operation console display 29, such as may be associated with an onboard management system and/or a user interface, that is configured to visually present information to the operator (e.g., information regarding control mode, control settings, tie-off displays, suggested tie-off patterns, available docking locations, and docking optimization instructions), present control options to the operator, and receive user input from the operator in response to the control options. One example of such a display system is VesselView® by Mercury Marine Company of Fond du Lac, Wisconsin. The operation console 22 and user interface system may further include one or more mobile devices not positioned at the helm of the vessel, such as a user's mobile device communicating with the control system 25 via an application, such as via VesselView Mobile® by Mercury Marine. Each of these devices inputs commands to the control system 25. Controllers 24 within the control system 25, in turn, communicate control instructions to the first and second marine drives 12a, 12b by communicating with the PCMs 26a, 26b. The steering wheel 32 and the throttle/shift levers 34 function in a conventional manner such that rotation of the steering wheel 32, for example, activates a transducer that provides a signal to the controller 24 regarding a desired direction of the vessel 10. The controller 24, in turn, sends signals to the PCMs 26a, 26b (and/or TVMs or additional modules if provided), which in turn activate steering actuators to achieve desired orientations of the marine drives 12a, 12b. The marine drives 12a, 12b are independently steerable about their steering axes. The throttle/shift levers 34 send signals to the controller 24 regarding the desired gear (forward, reverse, or neutral) of the transmissions 16a, 16b and/or the desired rotational speed of the engines 14a, 14b of the marine drives 12a, 12b. The controller 24, in turn, sends signals to the PCMs 26a, 26b, which in turn activate electromechanical actuators in the transmissions 16a, 16b and engines 14a, 14b for shift and throttle, respectively. A manually operable input device, such as the joystick 30, can also be used to provide control input signals to the controller 24. The joystick 30 can be used to allow the operator of the vessel 10 to manually maneuver the vessel 10, such as to achieve lateral translation or rotation of the vessel 10.

The propulsion system 20 also includes one or more image sensors 72, 74, 76, and 78. Although one proximity sensor is shown on each of the bow, stern, port and starboard sides of the vessel 10, fewer or more sensors could be provided at each location and/or provided at other locations, such as on the hardtop of the vessel 10. The image sensors 72-78 include visual light sensors, distance sensors, and/or directional sensors configured to generate image data. For example, each of the image sensors 72-78 may be any one of a radar sensor, sonar sensor, standard visual light camera, stereovision camera or other camera configured to measure depth information, laser sensor (e.g. lidar or Leddar), Doppler direction finder, or other devices individually capable of determining both the distance and direction (at least approximately), i.e. the relative position of an object O with respect to the vessel 10, such as a dock, a seawall, a piling, another vessel, etc. The sensors 72-78 provide information regarding both a direction of the object with respect to the marine vessel 10 and the shortest distance between object O and the vessel 10.

Regarding the image sensors 72, 74, 76, 78, note that different types of sensors may be used depending on the distance between the vessel 10 and the object O and/or its relative direction to the vessel 10. For example, radar sensors may be used to detect objects at further distances. Once the vessel 10 comes within a particular distance of the object, lidar, ultrasonic, Leddar, or sonar sensors may instead be used. Camera sensors (such as including one or more stereovision cameras) may be used, alone or in combination with any of the sensors mentioned above, in order to provide object proximity information to the CCM 24. Sensors are placed at positions on the vessel 10 so that they are at the correct height and facing direction to detect objects the vessel 10 is likely to encounter. Optimal sensor positions will vary depending on vessel size and configuration.

In FIG. 1, the image sensors are positioned at each of the front, sides, and stern of the vessel 10, and include front-facing sensor 72, starboard-facing sensor 74, rear-facing sensor 76, and port-facing sensor 78. In a different exemplary sensor arrangement, two image sensors may be placed on the hard top of the marine vessel 10 and arranged such that the fields of view of the two sensors, combined, cover the entire 360° area surrounding the vessel 10. Note also that the relevant controller, such as the sensor processor 70, may selectively operate any one or more of a plurality of sensors (including radars, lidars, Leddars, ultrasonics, and/or visual light cameras) to sense the shortest distance and the direction of the object with respect to the vessel 10. Alternatively, the sensor processor may use all available sensor data from all sensor types, which may be reviewed real-time as it is received or may be formulated into one or more maps or occupancy grids integrating all proximity measurement data, where the mapped data from all the operated sensors is processed as described herein. In such an embodiment, the proximity measurements and other information from the image data from each of the various sensors are all translated into a common reference frame, such as represented in a point cloud, occupancy grid, or other map of the environment.

Autonomous and/or advanced operator assistance (i.e., semi-autonomous) controls for improved vessel handling qualities require the placement of multiple image sensors on the vessel 10. In general, these various types of proximity sensing devices (examples described above) are positioned to detect the presence of objects in the marine environment surrounding the marine vessel 10, such as a dock, swimmer, or other obstruction in the path of the vessel. Each sensor reports proximity relative to its own frame of reference—i.e. the distance from the sensor to the object as measured along the view angle of the sensor. Depending on the type of sensor, the application of use, boat size, hull shape, etc., multiple sensor types and sensor locations may be required to provide adequate proximity sensing around the marine vessel 10 for operation in all marine environments. To create a cohesive dataset that can be used for purposes of vessel control and vessel navigation, including autonomous vessel navigation and semi-autonomous control (such as automatic maneuver-limiting control), all of the data sources are preferably translated to a common reference frame. This requires precise knowledge of the location and orientation of each sensor relative to the common reference frame such that the data measured therefrom can be translated appropriately.

In the example of FIG. 1, an inertial measurement unit (EIU) 36 is installed at a known location on the marine vessel with respect to a predefined point of navigation, such as the center of rotation (COR) or center of gravity (COG). The installation orientation or the IU 36 is also known. The installation locations of the IU 36 and each proximity sensor 72-78 are established as part of a calibration procedure for the proximity sensing system.

Referencing the example in FIG. 1, the IMU 36 may be part of an inertial navigation system (INS) such as including one or more micro-electro-mechanical systems (MEMS). For example, the INS 60 may consist of a MEMS angular rate sensor, such as a rate gyro, a MEMS accelerometer, and a magnetometer. Such INS systems are well known in the relevant art. In other embodiments, the motion and angular position (including pitch, roll, and yaw) may be sensed by a differently configured INS 60, or by an attitude heading reference system (AHRS) that provides 3D orientation of the marine vessel 10 by integrating gyroscopic measurements, accelerometer data, and magnetometer data.

The INS 60 receives orientation information from the IMU 36 and may also receive information from a GPS receiver 40 comprising part of a global positioning system (GPS). The GPS receiver 40 is located at a pre-selected fixed position on the vessel 10, which provides information related to global position of the marine vessel 10. The IMU 36 is also located at a known and fixed position with respect to the center of navigation determined for the marine vessel 10, such as the COR or COG.

The inventors have recognized that the above-mentioned operational challenges posed by a marine environment can be effectively dealt with by establishing and maintaining a buffer distance around the marine vessel, where the control authority provided to an operator is limited based on the buffer distance. For example, the control system 25 may continuously calculate a maximum velocity, or velocity limit, for the marine vessel as it approaches an object O, and may limit an operator's authority in controlling the propulsion of the marine vessel 10 such that the propulsion system will not effectuate a thrust that will cause the marine vessel to travel toward the object at a velocity that is greater than the velocity limit. Thus, the propulsion system does not respond to, or carry out, commands that would cause the vessel to violate the buffer distance and venture too close to an object. In certain embodiments, the propulsion control system may be configured to automatically maintain a predetermined buffer distance between the marine vessel 10 and an object O, such as to automatically effectuate propulsion controls in order to force the marine vessel 10 away from a marine object O when the buffer zone is violated.

Figure 2:
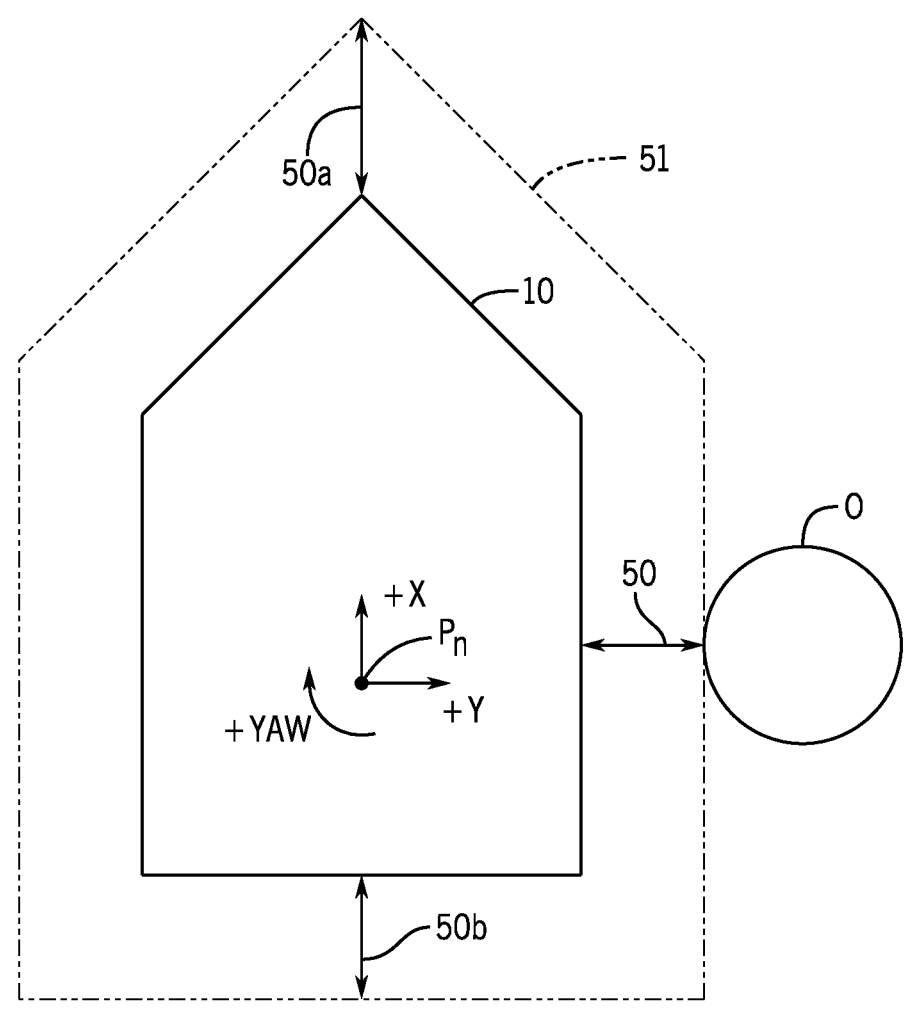
FIG. 2 schematically illustrates one implementation of a buffer distance maintained between a marine vessel and an object according to one embodiment of the present disclosure.

FIG. 2 is a diagram exemplifying this concept, where the marine vessel 10 is maintained at least the predetermined buffer distance 50 from the object O. A buffer zone 51 around the marine vessel 10 is defined, and velocity limits are calculated in order to progressively decrease the vessel velocity as it approaches the preset buffer distance 50 from the object O. In the depicted embodiment, the buffer zone 51 is established at a preset buffer distance 50 that is equal around all sides of the marine vessel. In certain embodiments, the buffer zone 51 may be asymmetrical with respect to the marine vessel, such as to provide a greater buffer distance 50a at the front side of the marine vessel than the buffer distance 50b on the rear side of the marine vessel. Similarly, a buffer distance on the starboard and port sides of the marine vessel 10 may be set the same or different than the front and rear buffer distances 50a, 50b.

Maintenance of the entire buffer zone is not always desired or practical, such as when the vessel is being docked and/or otherwise positioned to allow passengers to get on and off the marine vessel. image sensors Thus, the control system 25 may be configured to limit an operator's authority to control propulsion of the marine vessel in the direction of the object so as to provide a controlled approach and impact to an object, such as a dock. The control system 25 may be configured to modify or disable collision avoidance algorithms, such as the velocity limiting and autonomous buffer maintenance controls, upon receipt of a user-generated instruction to suspend the maintenance of the buffer distance from the object. Such as the dock. In some embodiments, the control system remains responsive to user control inputs via a user input device, such as a joystick, to move the marine vessel in the direction of the object so as to provide a smooth and controlled impact between the marine vessel and the object, and/or to hold the marine vessel against the object, such as while passengers disembark. The user control, such as via the joystick 30, remains intuitive during the velocity-limited control modality. For example, the limited user input authority provided via the joystick may be implemented by rescaling and/or offsetting the propulsion commands associated with the joystick positions.

In other embodiments, the control system 25 provides autonomous control of propulsion so as to navigate the marine vessel 10 in tight spaces, such as during docking and launch. The inventors have recognized that docking a marine vessel is a challenging task, especially with external factors common in marine environments, such as wind, waves, and current. Accordingly, the inventors have recognized that autonomous control may be beneficial for certain marine vessel control tasks, especially those tasks requiring high visibility at all points around the marine vessel and/or precise propulsion control. Docking and launch are prime examples of such tasks because operators standing at the helm typically do not have good visibility at important points of the marine vessel, such as near the corners and along the exterior sides of the gunnels on the marine vessel. Likewise, operators often do not have full visibility of an entire docking surface, which may be visually blocked by portions of the vessel, other objects between the vessel and the dock, and/or may be too far away for good visual identification by an operator. Accordingly, the inventors have developed docking control systems and methods whereby the control system 25 identifies optimized docking locations based on available tie-off points, and in some embodiments steps to move the marine vessel safely to an optimized docking location are be performed autonomously utilizing advanced closed-loop control in conjunction with image sensors at key points around the marine vessel.

The autonomous or semi-autonomous control algorithms, such as effectuated by the control system 25, include velocity control software performing algorithms to calculate a maximum velocity for the marine vessel 10 as it approaches an object O. Where propulsion control is based on user input, the control system 25 may calculate a maximum velocity for the vessel and effectuate velocity limits accordingly. In one embodiment, the velocity limits may be calculated based on a known maximum acceleration for the marine vessel. The maximum acceleration for the marine vessel may be based on the maximum vessel capabilities, such as the maximum positive or negative acceleration that can be effectuated by the propulsion system on the marine vessel 10 in the relevant direction of travel. Alternatively or additionally, the maximum acceleration for the marine vessel 10 may be predetermined, such as based on handling, comfort, or safety metrics.

Figure 3:
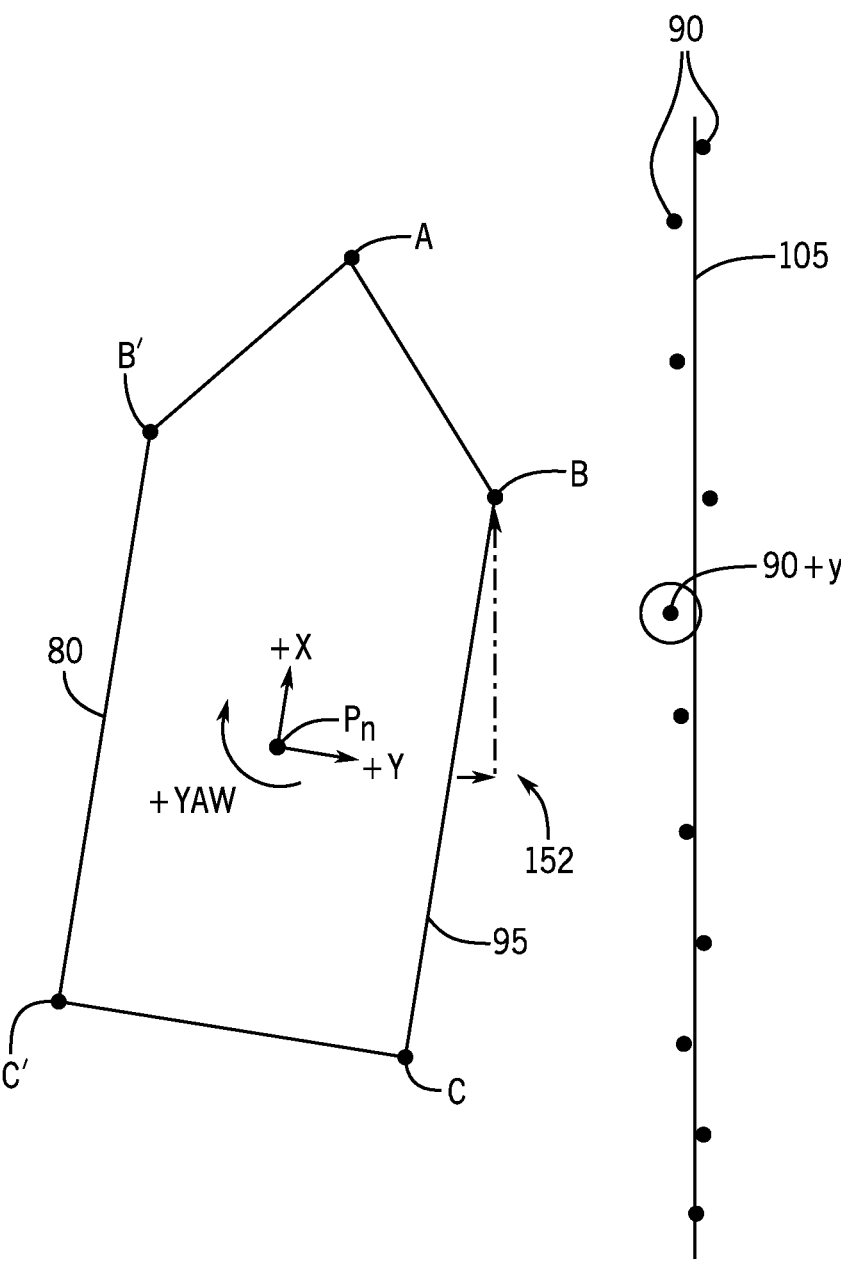
FIG. 3 illustrates one embodiment of a method for controlling propulsion of a marine vessel in an autonomous docking mode.

In certain embodiments, the control system 25 may be configured to identify potential docking surfaces in the marine environment around the vessel 10 based on the proximity measurements 90 by the various image sensors 72-78. As exemplified in FIG. 3, identifying the docking surface 105 may include identifying a linear relationship between a group of proximity measurements 90 located in a particular area. In one example, a docking surface 105 is identified based on the multiple proximity measurements 90 having a threshold linear relationship with respect to one another. In one embodiment, the docking surface 105 may be identified, or represented, as the best-fit line based on relevant proximity measurements 90. For example, the controller 24 may be configured to identify and assess proximity measurements adjacent to or near each of the points in the image data to determine whether such a linear relationship exists. For example, the image data may be a most important object (MIO) dataset specifying one closest proximity measurement in each of the +/−x directions, +/−y directions, and +/−yaw rotational directions. In the example at FIG. 3, the marine vessel is approaching a docking surface on the starboard side, and thus multiple proximity measurements 90 align along that side. The closest proximity measurement 90$_{+y}$ in the starboard direction may first be located, and then the linear relationship determination made therefrom. In other embodiments, all proximity measurements within a predetermined distance, such as calculated based on the simplified vessel outline 80, may be assessed to detect a linear relationship that represents a potential docking surface. A relevant side of the vessel outline 80 may be identified as the docking side, such as the side closest to the selected docking surface 105 selected by the user. In the depicted example, the docking surface 105 is on the starboard side of the marine vessel. Thus, the starboard docking side 95 of the vessel outline 80 (between the Cartesian coordinates of points B and C) is utilized for determining vessel alignment, where the docking surface 105 is also plotted with respect to the same coordinates centered on the point of navigation $P_n$.

Upon identification of one or more potential docking surfaces 105, 106, 107 around the marine vessel (FIGS. 5A-5B and 6A-6B), a user interface may be controlled to present a user with options to engage auto-docking with respect to one or more of those potential docking surfaces. Exemplary user interfaces configured for such purposes are disclosed herein (e.g., like that shown in one or more of FIGS. 5A-9B). Once a user selection is received to engage auto-docking with respect to a docking surface 105—e.g., by receiving a direction selection at a user input device (e.g., a touch screen, mouse or other selection device configured to interact with the display, or a joystick for selection of a direction with respect to the marine vessel, as described herein—the controller may execute instructions to align the marine vessel 10 with the selected docking surface or surfaces and/or to move the marine vessel toward the selected docking surface such that it gently impacts it. Velocity control may be engaged for such maneuvers based on the proximity of the docking surface and/or the needed alignment adjustment. For example, the velocity may be calculated using methods known to those skilled in the art, replacing the propulsion control user input with controller-determined instructions for aligning the marine vessel with the dock at the buffer distance and then moving the marine vessel up against the dock, which are angular and linear distance-based velocity determinations. In the example depicted at FIG. 3, the controller-determined instructions may effectuate a thrust in the –yaw direction until the slope 152 between the docking side 95 and the selected docking surface is minimized, such as where the magnitude of the slope is less than a threshold slope representing alignment.

In certain embodiments, the control system 25 and the user input device(s) for providing docking-related control functionality, such as a joystick 30 or keypad 28, may be configured to allow a user to select a docking surface and/or available docking location. For example, the user interface display 120 may be configured to display all potential docking surfaces 105 identified around the marine vessel 10. For example, the user interface or user input device may visually depict multiple potential docking surfaces by illuminating or otherwise indicating the direction of the potential docking surfaces with respect to the marine vessel. Alternatively, the potential docking surfaces 105 may be bolded or otherwise highlighted on the display to indicate they are available for selection.

Figure 4:
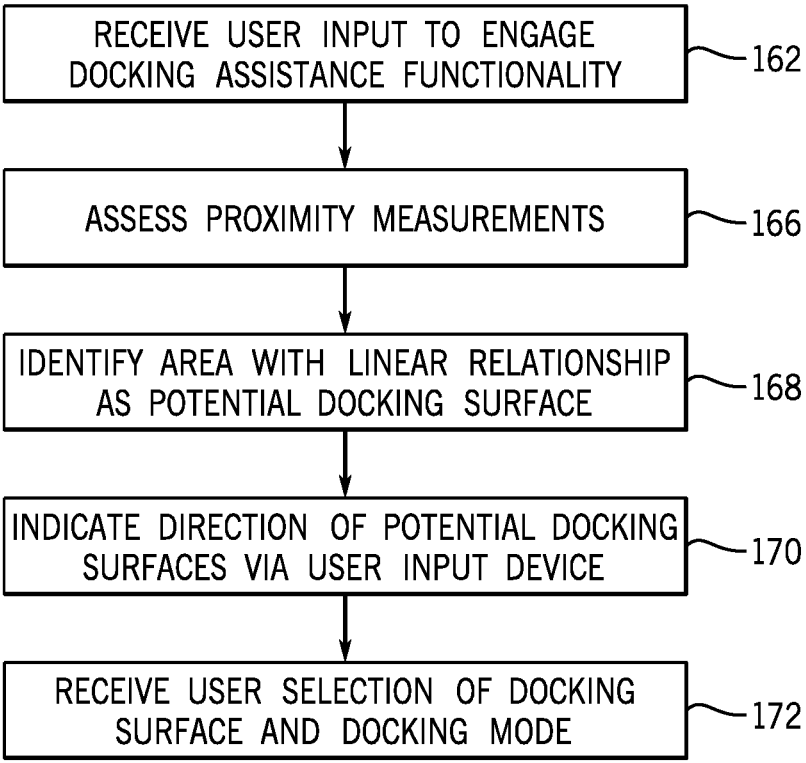
FIG. 4 is a flow chart exemplifying a method for controlling a propulsion system in accordance with embodiments of the present disclosure.

FIG. 4 depicts one embodiment of a method of operating a propulsion system 20 for controlling docking of a marine vessel. User input is received at step 162 to engage docking assistance control functionality. This may be a user input provided to initiate the control system to detect potential docking surfaces 105. For example, the docking assistance functionality may be engaged in response to a user depressing the center key 116 on the keypad 28. Similar inputs may be provided via other user input devices, such as via a button 31 associated with the joystick 30. Once the docking assistance functionality is engaged, a data set of proximity measurements is identified at step 166. Potential docking surfaces 105 may then be identified by assessing the image data, which may include proximity measurements. In other embodiments, visual image processing methods, such as computer vision machine learning (CVML), edge detection, and/or other pattern detection methods may be employed to identify a potential docking surface. In still other embodiments, the system may be configured to process visual image and depth information, such as generated by one or more stereovision cameras, to identify a potential docking surface.

Where proximity measurements are utilized, such as or including depth information generated by a stereovision camera, proximity measurements having a linear relationship may be located and then a potential docking surface 105 is identified at step 168 based on the located linearly aligned proximity measurements. For example, the potential docking surface may be identified as the least squares regression line or other best-fit straight line of a group of proximity measurements, such as may be represented in a point cloud, occupancy grid, or other map of the environment generated based on the image data. Alternatively or additionally, a CVML model may be trained to recognize a variety of types of potential docking surfaces based on the image data, such as docks, pilings, sea walls, or the like. The identified potential docking surface(s) may be labeled in a map generated based on the image data and/or proximity measurements, such as in an occupancy grid map or a point cloud map. In one embodiment, an approximated straight line of at least the threshold length of the marine vessel may be superimposed on the display to indicate potential docking surfaces (which may include a plurality of elements and/or uneven surfaces that approximate a straight line, such as a set of pilings in a straight line, a seawall, or the side of a vessel with one or more bumpers thereon) but remain viable docking surfaces.

A direction of the identified potential docking surface with respect to the vessel's current location and/or orientation is indicated via a user interface display at step 170. A user selection is then received via the user input device at step 172 to select a docking surface and/or a docking mode. With reference to the examples described above, for example, the control system 25 and user interface display 120 may be configured to allow a user to select one of an auto-docking mode or a semi-autonomous docking mode where a user is provided some limited authority to control the marine vessel in order to effectuate docking.

Figure 5A:
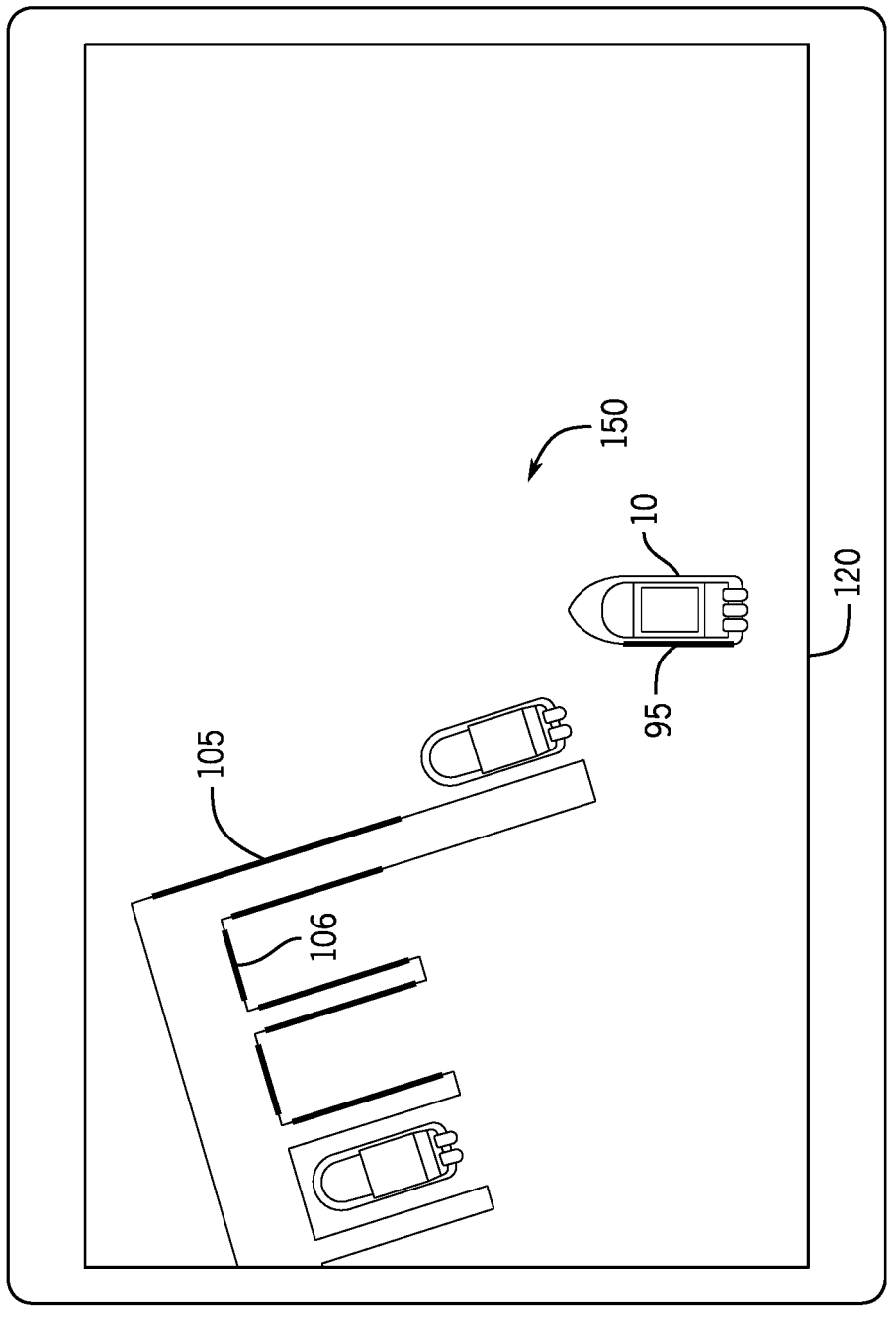
FIG. 5A-5B are exemplary displays of a docking area indicating a plurality of available docking locations according to one embodiment of the present disclosure.
Figure 5B:
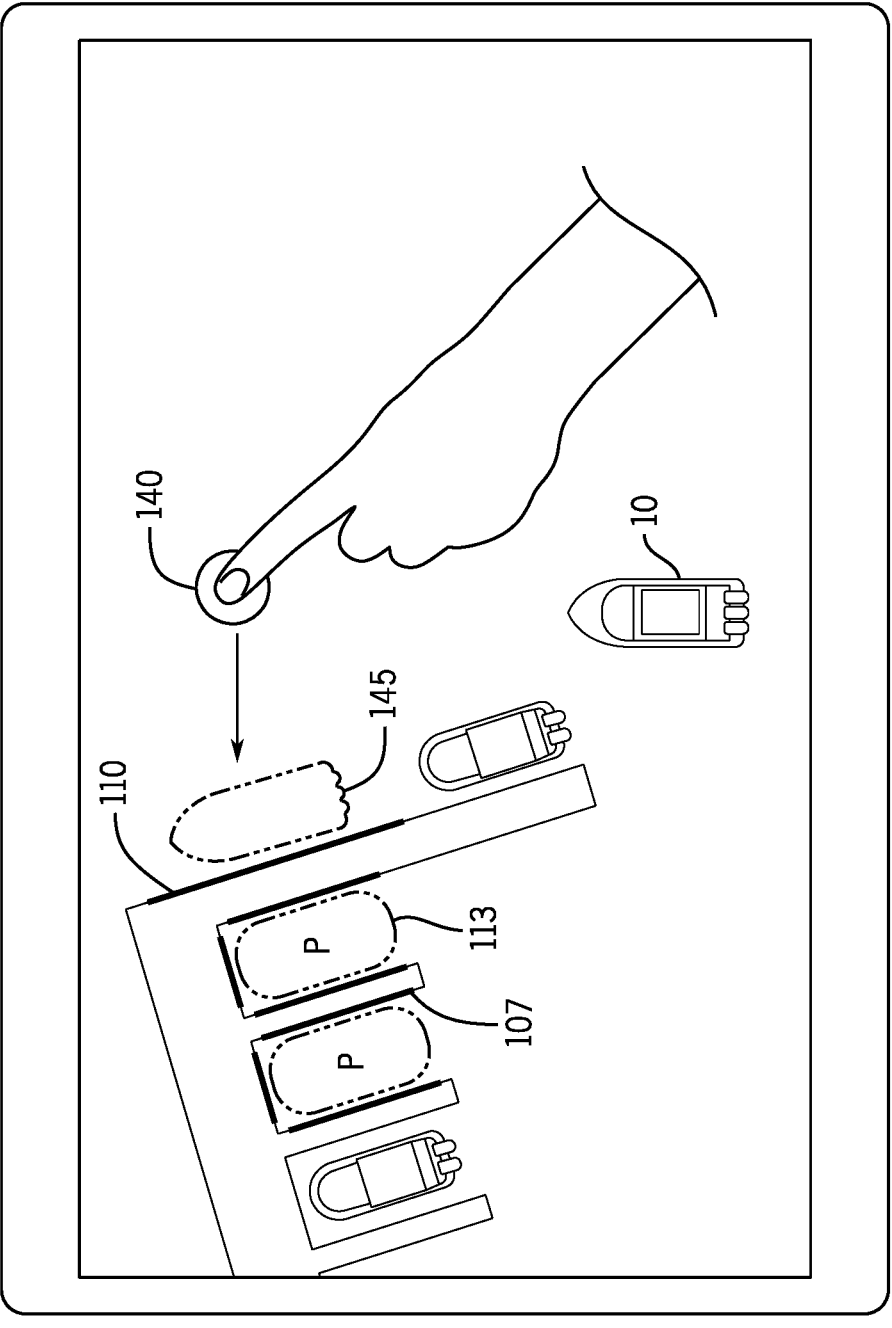

Referring now to FIGS. 5A-5B, the position of a selected docking location 145 may be adjustable. As a selected location on the display 140 is selected proximal to an available docking location 113 in the docking area 150, the available docking location 113 becomes a selected docking location 145. In one embodiment, the control system may associate a default orientation of the marine vessel 10 in relation to the selected docking location 145. This may include a predetermined selected docking side 95 that is adjacent to the docking surface 110 associated with the selected docking location 145. These positional settings may be based on the current position and/or orientation of the marine vessel 10. Alternatively, the docking side 95 and/or orientation of the marine vessel 10 may be selectable by the user. Similarly, the location of the selected docking location 145 may be adjustable in relation to its position along the selected docking surface 105, as further disclosed in FIGS. 9A-9B. Upon selecting a docking side 95, the selected docking side 95 may determine the orientation of the marine vessel 10.

Figure 6A:
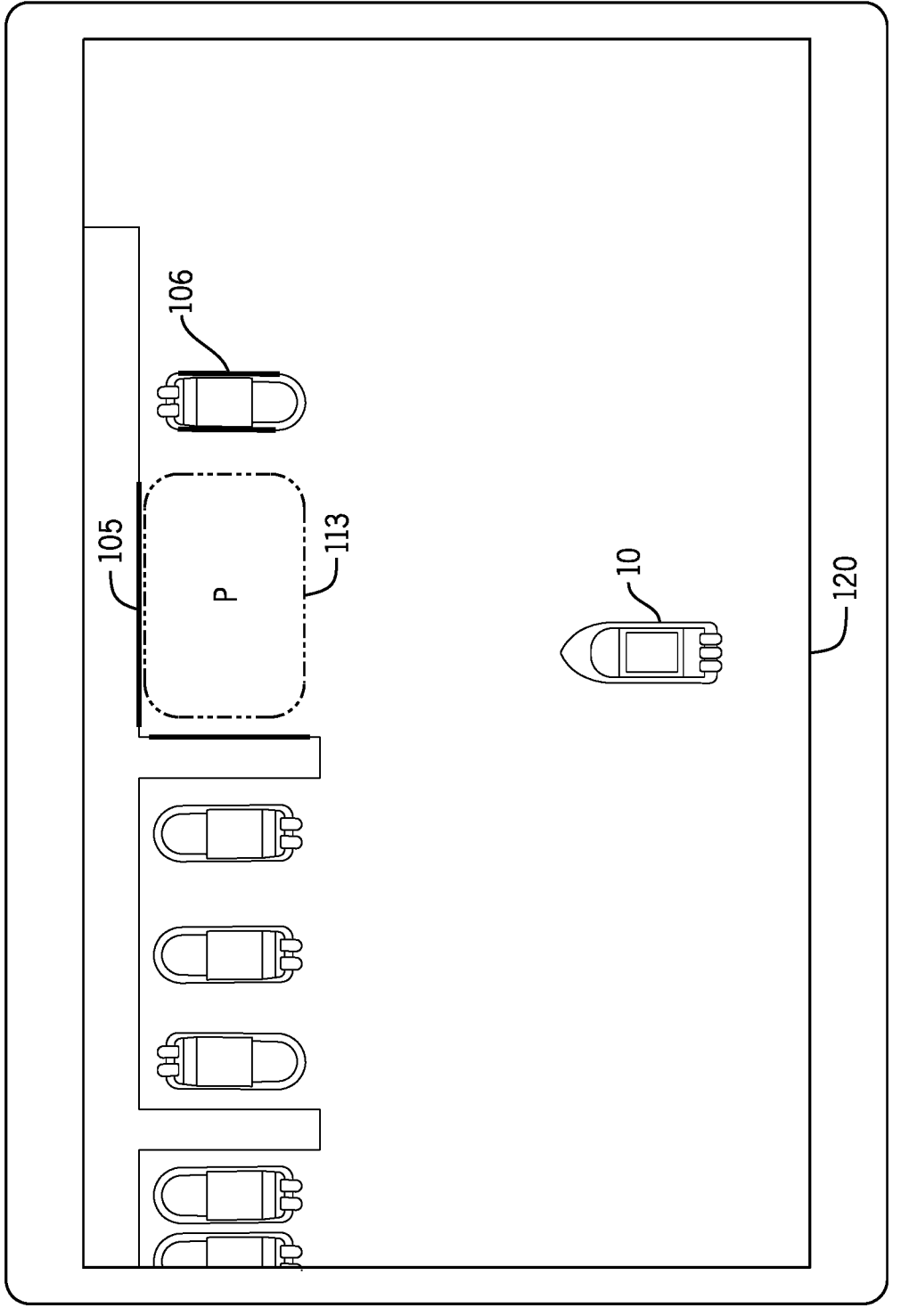
FIGS. 6A-6B show exemplary displays of a docking area indicating a plurality of docking surfaces, according to one embodiment of the present disclosure.
Figure 6B:
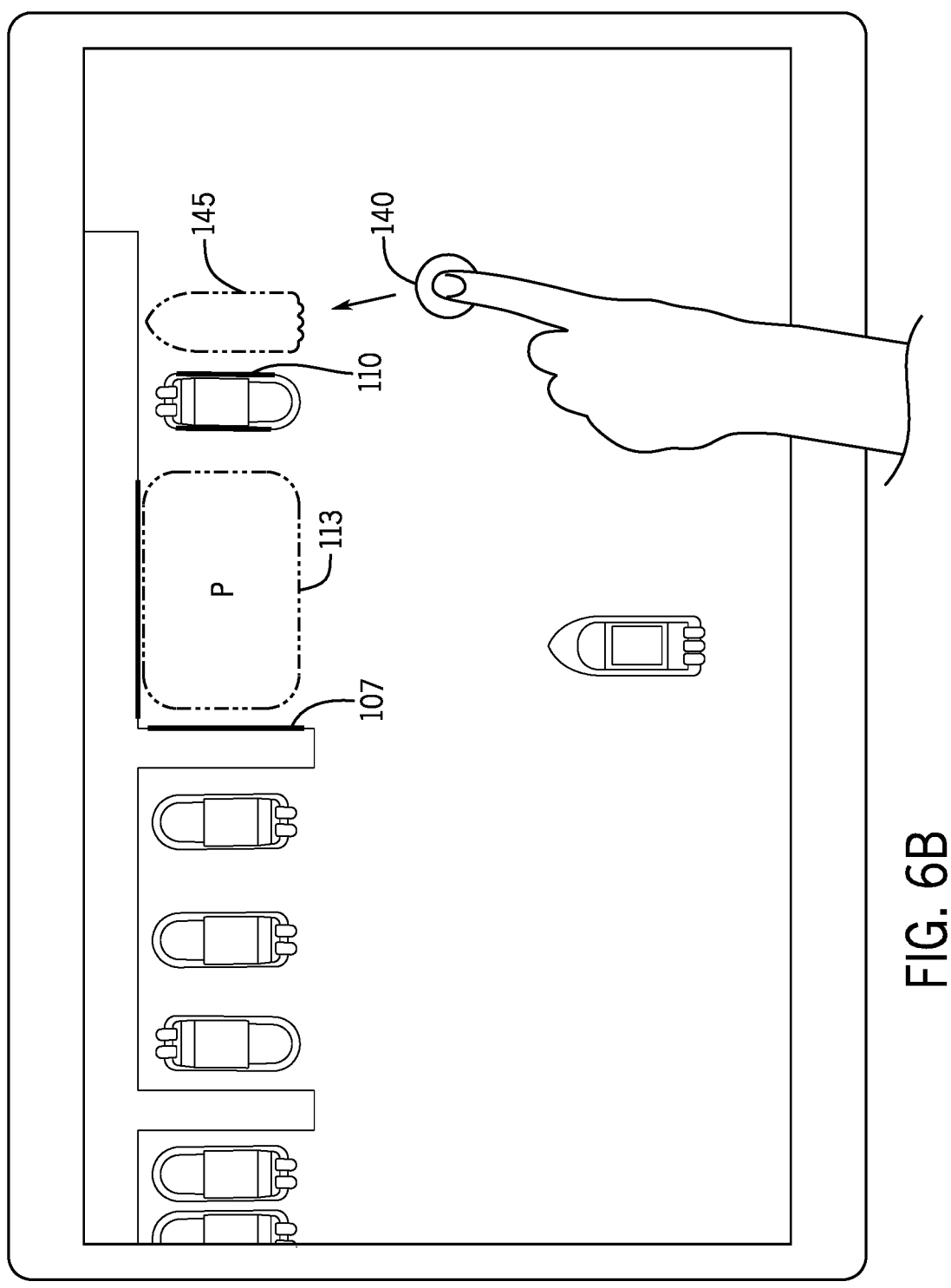

Alternatively or additionally, the orientation of the marine vessel 10 may be determined by the selection of a docking side and/or a selection of a docking surface 105. In one embodiment, docking surfaces 105, 106, 107 may be associated with predetermined options for marine vessel 10 orientation in relation to the docking surface 105, 106, 107 based on the type of docking surface (e.g., finger slip, U-shape dock, straight dock, pilings, seawall, etc.) and/or stored rules with respect to a certain docking area (e.g., stored in association with geographical information and/or chart data). As an illustrative example, a docking surface 106 on the interior surface of a u-shape dock may only allow the user to select between a bow-in orientation and a stern-in orientation. The control system may be configured to recognize that these are the optimal and/or only possible or permitted orientations for the marine vessel 10, for example, because the sides of the u-shape dock may obstruct other orientations and/or only certain docking orientations may be permitted in a docking area and/or for a certain type of dock. However, if the control system determines the dock type can accommodate multiple docking orientations, such as a u-shape dock large enough for docking of multiple vessels (as depicted in FIGS. 6A-6B), available docking orientations and docking surfaces 106 may be presented and selectable accordingly. In another embodiment, available docking orientations may be determined by available docking surfaces 105, 106 regardless of the size of a type of docking surface.

Figure 8:
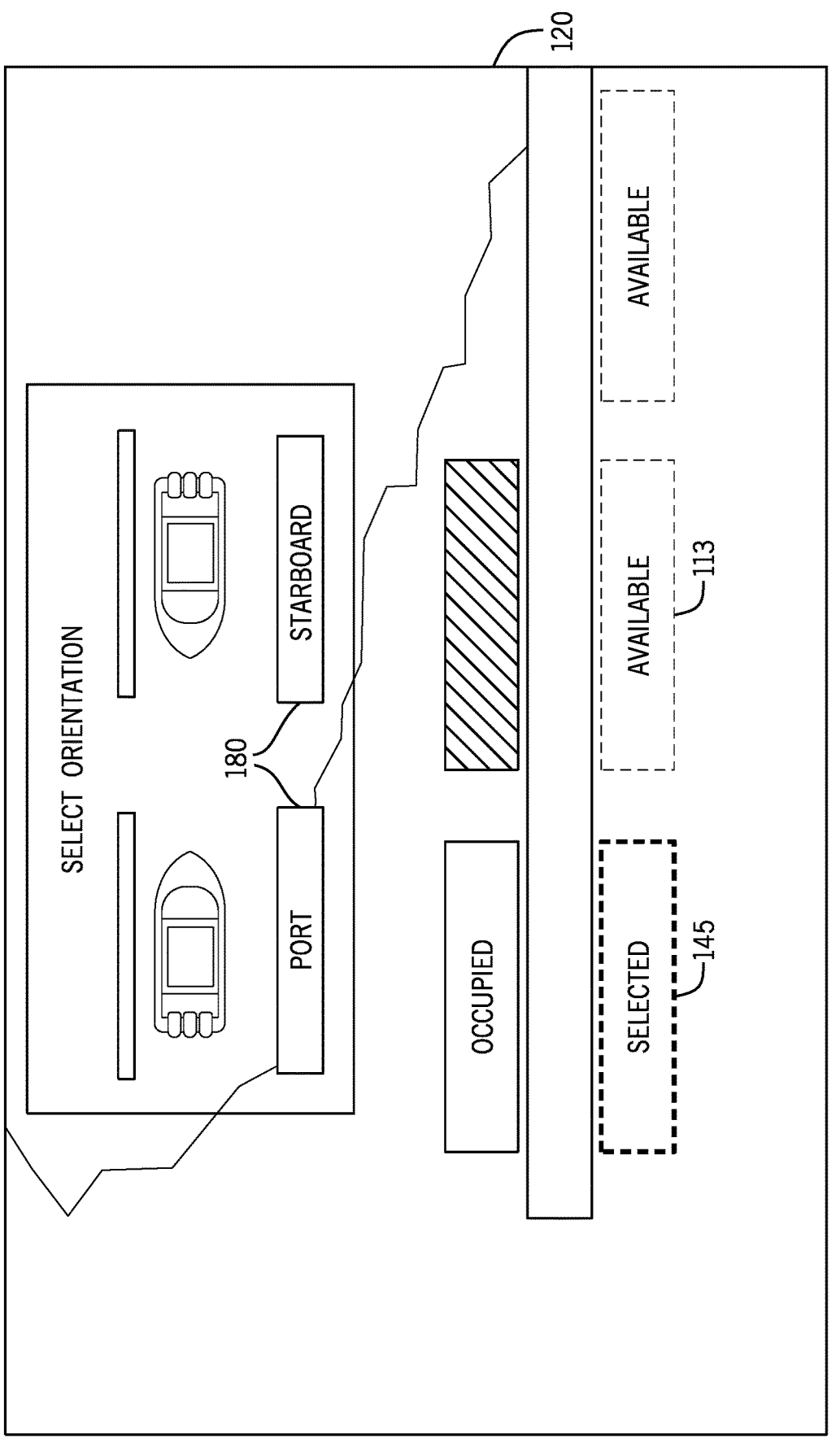
FIG. 8 is an exemplary display of a docking area illustrating a selected docking location according to one embodiment of the present disclosure.

In one embodiment, the control system may associate types of potential docking surfaces or docking location types identified by a CVML model with specific docking orientations. The control system may present only the available docking sides associated with permitted docking orientations for a particular detected dock type (as illustrated in FIG. 8). This may prevent the selection of a docking surface that would align the marine vessel in an impermissible orientation incompatible with, or not permitted for, the selected docking location. As an illustrative example, referring to FIGS. 6A-6B, the u-shape dock may be configured to only permit stern-facing and bow-facing orientations so as to maximize the number of vessels that can be accommodated. The control system may be configured to recognize the permitted docking orientations, such as based on dock shape (where the docking surface 105 on the distal end of the u-shape dock is commonly associated with this docking orientation), based on locations of dock tie-off points, orientations of surrounding vessels, signage, available information for a docking area, etc. Alternatively or additionally, the control system may be configured to recognize predetermined docking orientations for a selected docking location 145 through: pattern recognition of a comparison of the selected docking surface 105 and previously selected docking surfaces, as stored in a database of previously successful docking executions, a pattern recognition of occupied docking surfaces detected in the image data that are similarly oriented to the selected orientation of the marine vessel, and comparing the frequency of specific docking orientations with docking surfaces to the orientation of the marine vessel at the selected docking surface 105, crowdsourcing, and/or accessing a database stored in memory wherein docking surfaces associated with identified types of available docking locations and/or dock types specifies possible docking orientations for the marine vessel, as a non-limiting list of examples.

In determining available docking locations in a docking area, the control system may identify a plurality of available docking locations 113 and/or docking surfaces 105, 106, 107 on the display 120 (this embodiment is illustrated in FIGS. 5A-5B and 6A-6B). In one embodiment, identified available docking locations 113, the closest available docking location 110, and docking surfaces 105, 106, 107 may be highlighted or otherwise visually designated on the display, wherein the visual designators are selectable. In one embodiment, the closest available docking location 110 may be determined by a selected location on the display 140. In one embodiment, the control system may receive user input for an available docking location 113, a docking surface 105, and may also specify the orientation of the marine vessel 10. Additionally or alternatively, a default orientation may be selected based on closest available orientation to marine vessel's 10 current orientation.

Referring again to FIGS. 5A-5B, a selectable region, or area, may be defined on the display for each docking location and/or available docking surface indicated on the display. For each identified docking surface and/or available docking location indicated on the display, a unique selectable area on the display is defined. User input selecting the region, such as touching a location on the display 140 within the defined region of the display 120, is registered as a selection of the respective docking location and/or available docking surface to which the region on the display is associated. The size, shape, and location of the regions of the display 120 may be determined by the control system based on the available docking locations and/or docking surfaces identified in the image data.

In one embodiment, a selectable region may be defined by allocating a predefined number of pixels or a threshold area around the visual indicator of a docking location and/or available docking surface. For example, each identified docking surface and/or docking location may be allocated a buffer of 50 pixels on the display. In other embodiments, the control system may define regions on a display such that any selection on the display (including undockable locations such as 'on' a dock or shore) selects one available docking surface and/or docking location.

In cases where there are two or more available docking surfaces and/or available docking locations in close proximity, the control system may apportion smaller selectable areas around each identified docking surface and/or location or may allocate the area such that it is not centered around the visual indicator. The control system may generate these selectable areas to improve the ease of selectability for situations where several available docking locations and/or surfaces are in close proximity on the display and difficult to select because of the size of the docking locations and/or docking surfaces on the display.

In some embodiments, the closest available docking surface 110 to the selected location on the display 140 may be identified as the desired docking location. The display may indicate this selected with an indication of the selected docking location 145 and/or selected docking surface such as an outline of the marine vessel at the selected docking location 145 or selected docking surface.

In some embodiments, the control system may highlight or otherwise indicate a selected docking location or docking surface while maintaining the presence of the other available docking locations and/or docking surfaces for selection. In this embodiment, the control system may switch which available docking location and/or docking surface is selected when a user selects a second region on the display associated with a different available docking surface and/or docking location after selecting a first.

In one embodiment, the control system may define the regions of the display based on a grid system that utilizes a spatial plane, such as defined according to a known geographic coordinate system (e.g., GPS coordinates). Alternatively or additionally, the imaging system may capture measurements of distance from the marine vessel. The control system may generate a grid system of equivalents that correlate measurements determined from received image data to a proportional representation on the display.

Available docking locations may be determined by comparing the measured lengths of potential docking surfaces and/or docking locations in the docking area to at least one dimension of the marine vessel. In one embodiment, the control system may define the threshold length required to classify a location in the docking area as an available docking location based on the length of the selected docking side of the vessel (wherein a length of each docking side is stored in memory) to comparatively determine what locations in the docking area are viable options for docking. The location on the display of the docking area may be highlighted or otherwise annotated to signify available docking locations and/or docking surfaces.

Figure 7:
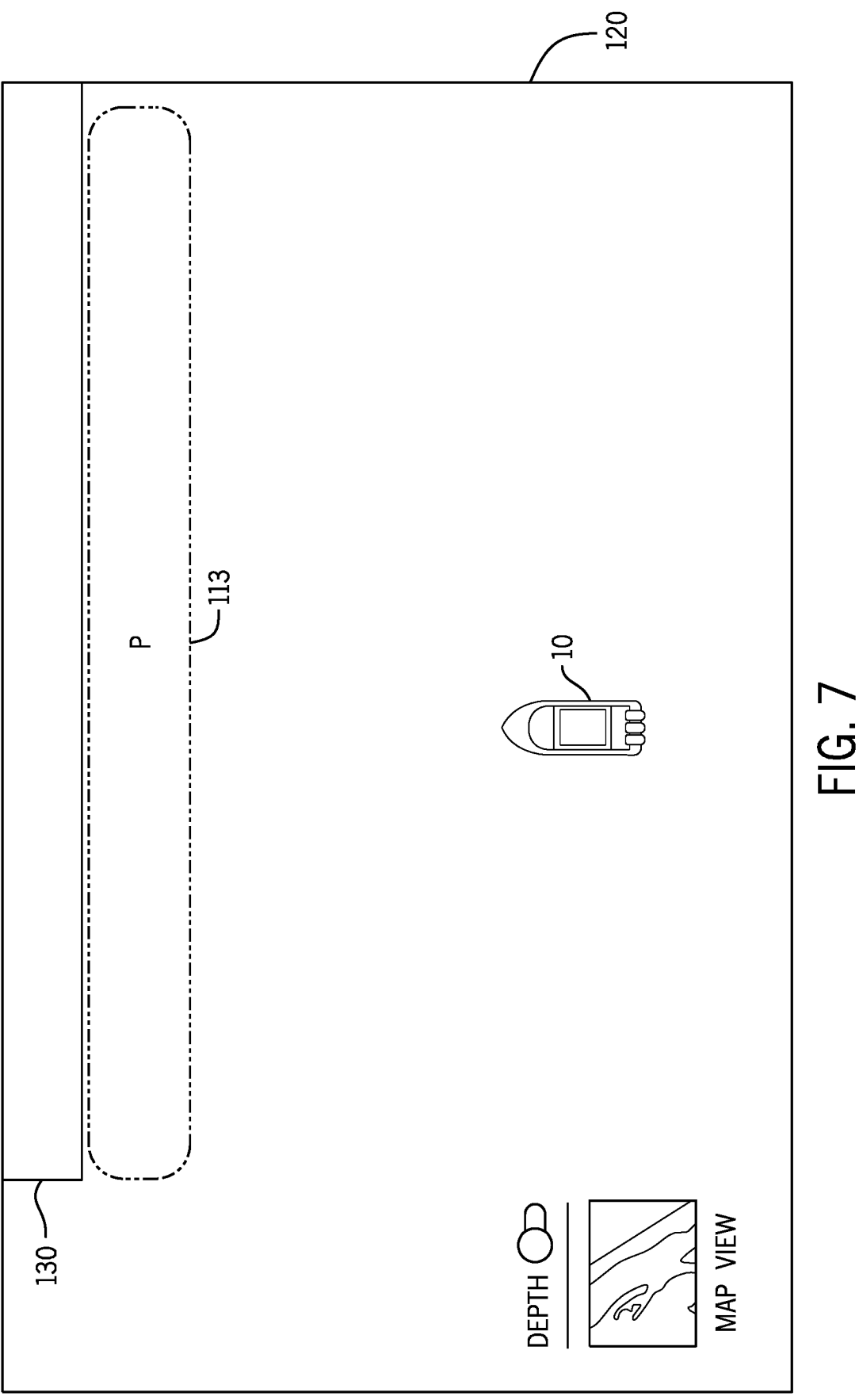
FIG. 7 is an exemplary display of a docking area illustrating a docking surface according to one embodiment of the present disclosure.

Referring now to FIG. 7, the continuous length and/or size of an available docking location 113 and/or docking surface may be indicated when illustrating availability, such as to allow selection anywhere along a continuously available docking surface where no vessel is already located. If the length and/or size of an available docking location 113 and/or docking surface exceeds the threshold length used to determine the availability of locations on the display of the docking area, the selected docking location may be adjusted within the limits of the available docking location 113 and/or docking surface upon selection. When a selected region of the display 120 indicates an available docking location 113 and/or docking surface is the selected docking location or the selected docking surface, the control system may approximate the closest location to the selected location, which may be a selection of a spot and/or pixel(s), on the display 120 (within the bounds of the selected docking surface or location) and center the selected docking location at the location closest to the selected location on the display 120. This may similarly apply when a non-dockable location (such as selecting the dock 130 rather than an indicated available docking location or docking surface) is selected by the user. The control system may determine, based on the selected location on the display 120, which available docking location 113 is closest and center the marine vessel 10 within the selected docking location at the point closest to the selected location on the display.

In another embodiment, the control system may identify the selected docking location based on the selected location on the display 140 without generating all available docking locations and/or docking surfaces. In this embodiment, the control system uses the geospatial mapping associated with the display to determine the closest available docking surface to the marine vessel without making a query to the image data. This means that the control system only determines the location of the closest available docking surface without analyzing the image data to determine all available docking locations in proximity to the marine vessel. Rather, without first determining the location of all available docking locations and/or docking surfaces, the control system may identify docking locations based on the location of the selected location on the display. Staying within the interface of the display and using geospatial mapping and/or chart data, the control system may determine the location of the closest available docking surface based on the location between the selected location on the display and the location of the docking area. The identification of one available docking surface instead of determining all available docking locations and/or docking surfaces may reduce the time required for the control system to determine an appropriate docking location for the marine vessel. In one embodiment, the control system may access information received from the GPS receiver and/or stored geographic information (such as C-MAP cartography charts provided by Navico Inc.) to determine available docking locations with the docking area, without taking the processing time to receive and analyze image data from the imaging system. In this embodiment, image data may supplement information received from the GPS receiver and geographic maps. In another embodiment, GPS information may provide additional information regarding the availability of potential docking location, such as when an available docking location may be unfit for docking based on an underwater obstruction or water that is too shallow for the marine vessel to successfully dock. Upon the approval of a selected docking location, the control system may autonomously generate a navigation path for the marine vessel to the target docking location based on a set of GPS coordinates.

Referring now to FIG. 8, the control system may be configured to define discrete available docking locations 113 and/or docking surfaces, such as based on dock tie-off points and/or the relevant dimension(s) of the marine vessel (such as the length of the selected docking side). Alternatively or additionally, the control system may be configured to define discrete available docking locations 113 based on chart or other map data, such as locations physically or virtually defined for a marina (e.g., slips and other predefined docking areas that may be rented, owned, or otherwise utilized). The number of available docking locations 113 may change depending on the size of the marine vessel. For example, on a 60-foot finger dock, the control system on a 20-foot vessel may define three available docking locations along the 60-foot finger dock surface. On the same dock, the control system for a 30-foot marine vessel may only identify two available docking locations 113 along the side the dock. In determining the size of an available docking location and/or docking surface, the control system may account for any clearance distances surrounding the marine vessel. Consideration for clearance distances, such as a buffer distance, may be accounted for by the control system when assessing the availability of docking locations and/or docking surfaces in a docking area. Alternatively or additionally, the clearance distance may be accounted for after an available docking location 113 has been selected and the marine vessel's position and/or orientation is confirmed within the selected docking location 145. In some embodiments, the clearance distance may be controllable by a user. For example, the control system may be configured to present a user input option on the display wherein a user can adjust the clearance distance maintained on the front, rear, and/or sides of the vessel. In one embodiment, the clearance distance(s) may be individually adjustable such that the user can set different distances on each side of the vessel so as to define the shape and size of a buffer zone around the marine vessel. The docking assessment is then conducted to account for the clearance distance(s) and the docking options and the vessel location may be rendered accordingly to visually represent the clearance distance(s).

In one embodiment, direction indicator(s) 180 may provide a user's preferred orientation to the control system. A direction indicator 180 may be presented on a display, such as a touch screen, and may be selectable via touch input in an area on or near the direction indicator. Alternatively or additionally, the direction indicator may be presented on and/or selectable with a joystick or other user input device at the operation console. The selection of a direction indicator 180 may indicate a selected side of the marine vessel. The control system may determine the orientation of the marine vessel by placing the selected side of the marine vessel in the closest adjacent proximity to the selected docking surface. In one embodiment, the alignment and/or proximity of the selected side and docking surface may be used to indicate when the marine vessel has docked.

Figure 9A:
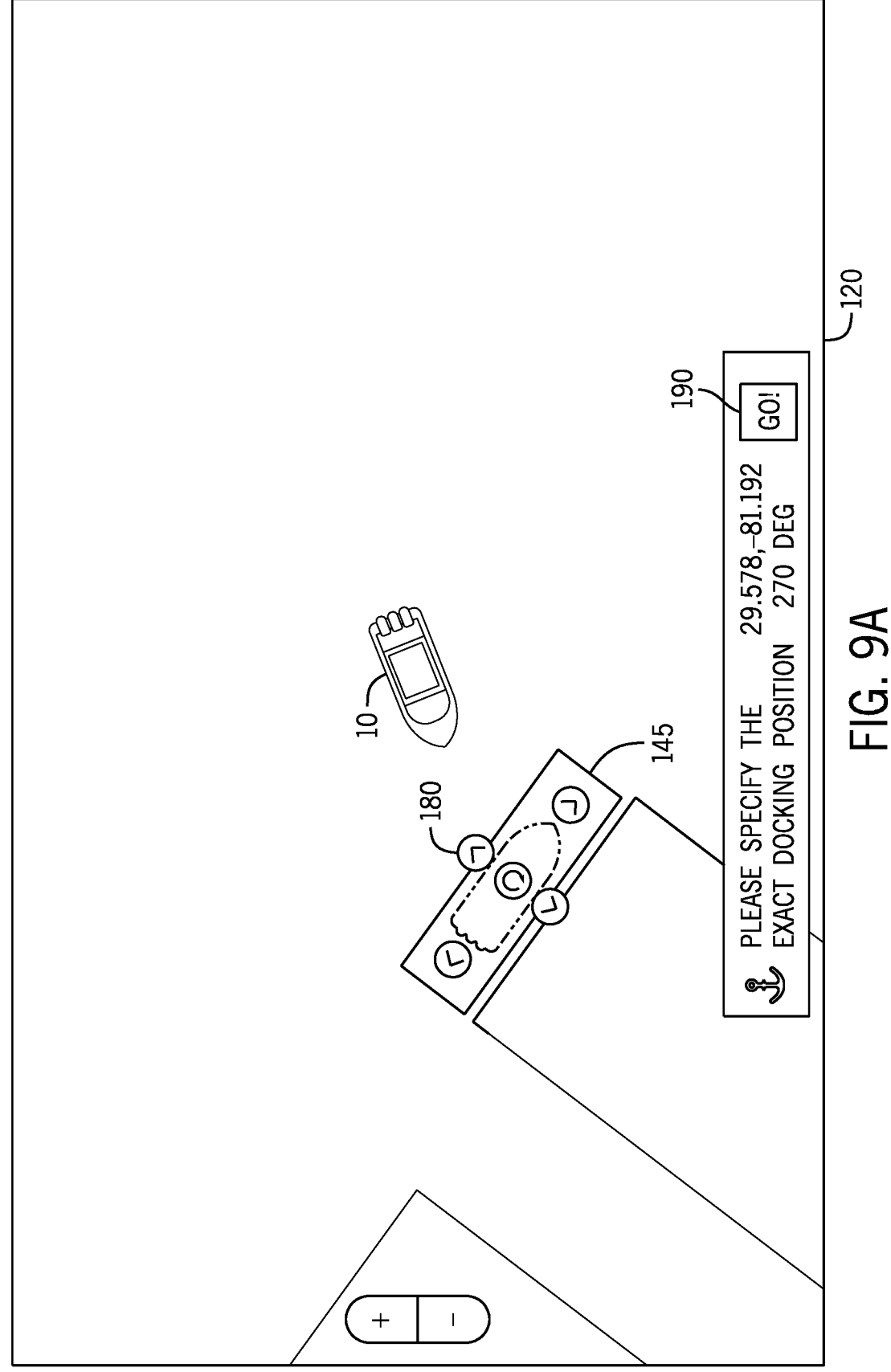
FIG. 9A is an exemplary display of a docking area illustrating options for adjustment according to one embodiment of the present disclosure.
Figure 9B:
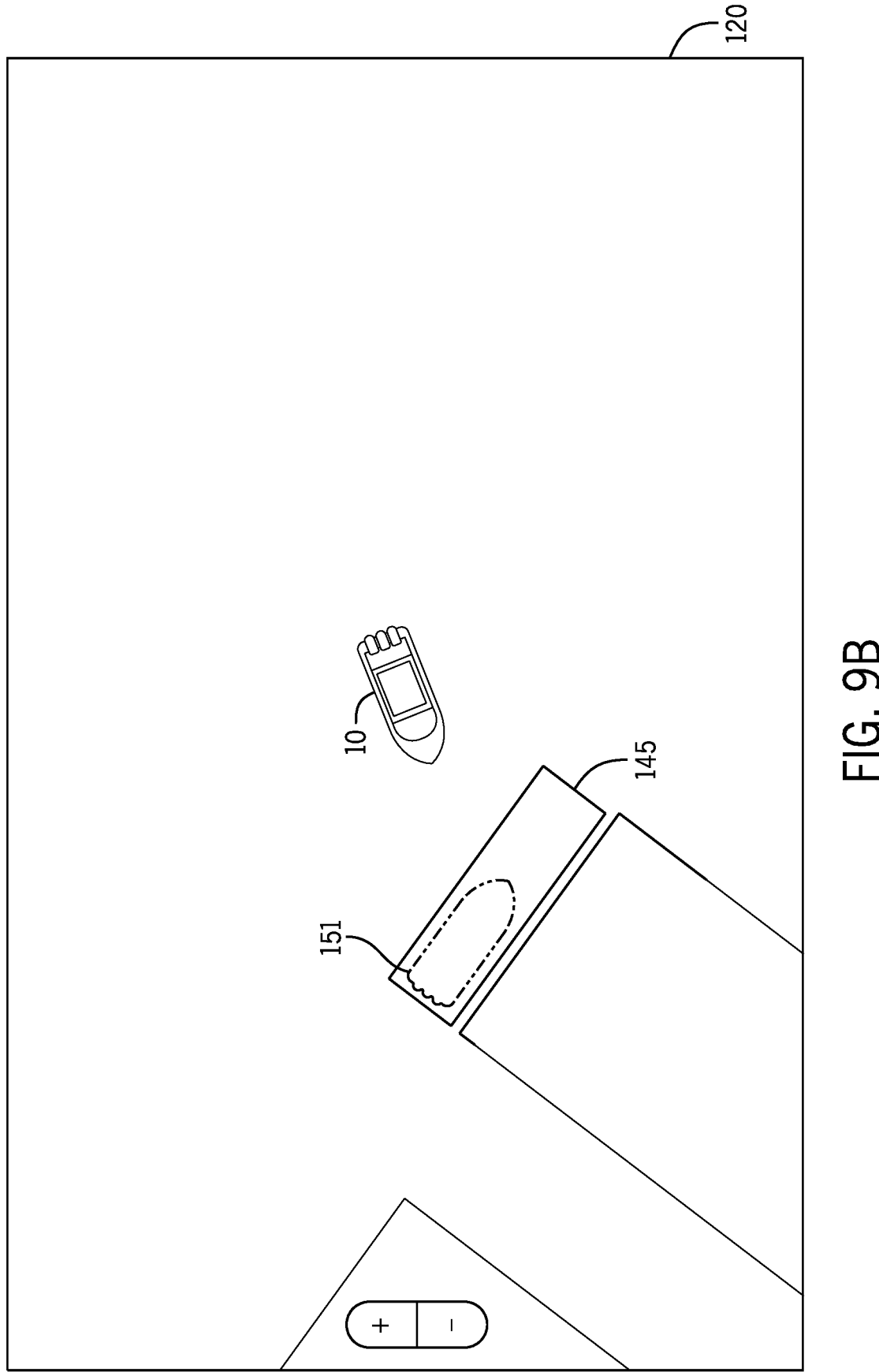
FIG. 9B is an exemplary display of a docking area illustrating a target docking location according to one embodiment of the present disclosure.

Referring now to FIGS. 9A-9B, as the selected docking location is confirmed, the system may be configured to prompt a user to confirm or adjust the selected docking location 145. For example, the control system may present direction indicators 180 on the display 120 that, upon selection, may move the position of the marine vessel 10 forward, backwards, in a starboard lateral direction, in a port lateral direction, or rotate the marine vessel about a central axis, as non-limiting examples. The control system may use the IMU, the INS, and/or the current global position of the marine vessel 10 received from the GPS receiver, as information from which the center of the marine vessel 10 may be determined. Upon receiving user input selection of at least one direction indicator 180. The control system may update the display 120 to reflect the selection, such as presenting the marine vessel 10 forward from its original position. Upon selection of a confirmation indicator 190, the display of the docking area may update to represent the marine vessel 10 docked at an adjusted position within the selected docking location 145. If the selected docking location 145 is confirmed via a confirmation indicator 190, the location (such as a GPS location) and orientation (such as a heading with respect to north) of the selected docking location 145 becomes the target docking location 151. When the confirmation indicator 190 is selected, the marine vessel 10 may begin controlling propulsion to navigate the marine vessel towards the target docking location 151. When applicable, the marine vessel 10 and docking method maintains the set clearance distance around the marine vessel while executing the docking process, such as based on a preset buffer distance or buffer zone.

After an available docking location has been selected, the control system may present direction indicators 180 to make adjustments to the position and/or orientation of the marine vessel 10 within the confines of the selected docking location 145. Adjustments within the available docking location 145 may be presented as a free form of movement along one or more tracks with respect to a docking surface, wherein the position of the marine vessel can be "slid" by a user input within the confines of the selected docking location. In one embodiment, the input received from the user may indicate an adjustment direction and the control system may move the marine vessel (on the display) by a predetermined amount until the confirmation indicator 190 is selected, confirming the new position of the marine vessel 10. Methods of adjustment may include user input from various sources; the vessel outline may be dragged within the selected docking location on the display or the control system may receive user input from the use of a joystick, buttons, or a dial, as non-limiting options. Upon selection of the confirmation indicator 190, the display of the docking area may update to represent the marine vessel docked at the target docking location. The control system may also navigate the marine vessel to the target docking location and heading specified by the adjusted position and orientation of the marine vessel.

Figure 10:
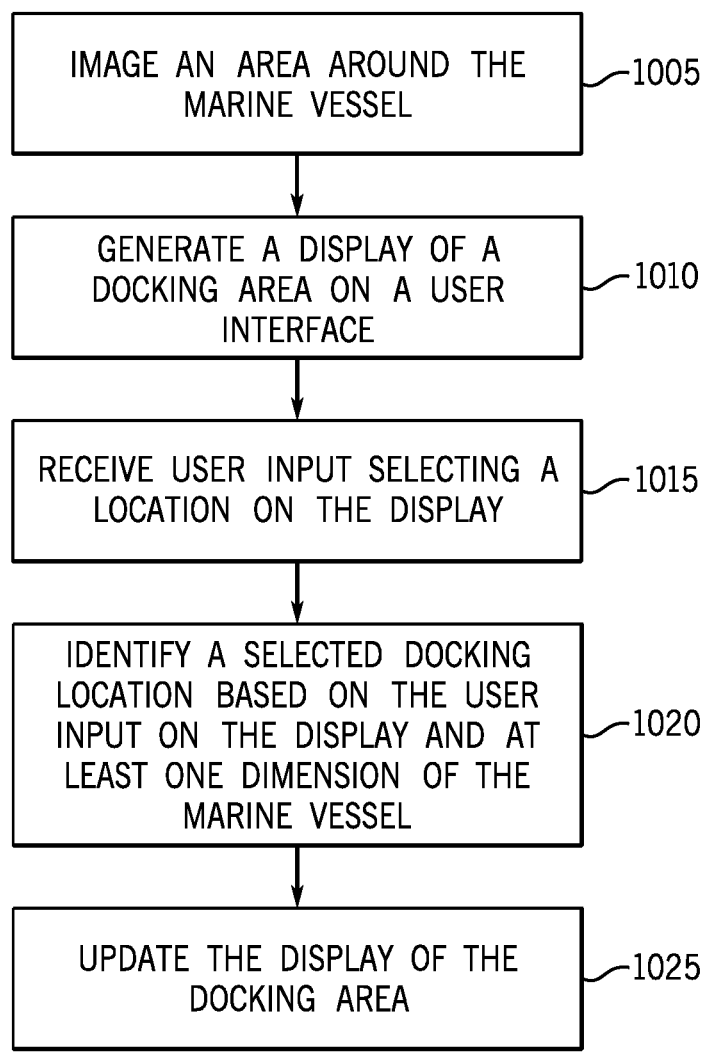

FIG. 10 illustrates an exemplary method for controlling docking. At 1005, an area around the marine vessel is imaged, such as by the imaging system 65. At 1010, a display of a docking area is generated on a user interface, based on the image data generated by the imaging system. At 1015, user input is received by the control system, selecting a location on the display of the docking area. At 1020, a selected docking location is identified based on the a selected docking location based on the user input on the display and at least one dimension of the marine vessel. At 1025, the display of the docking area is updated by the control system to represent the marine vessel docked at the selected docking location.

FIG. 11 illustrates an exemplary method for controlling docking. At 1105, at least one docking surface is identified, such as by the control system, and displayed in the display of the docking area. At 1110, at least one available docking location is identified in the docking area based on the image data received by the control system, as well as by at least one dimension of the marine vessel. In one embodiment, the at least one dimension of the marine vessel may be accessed by the control system from a database stored in memory. At 1115, the display of a docking area is generated by the control system to highlight each of the at least one available docking location for selection by a user. At 1120, a region of the display is assigned to each of the at least one available docking location, such as by the control system. In one embodiment, the size and/or shape of the regions of the display may be determined by the number of available docking locations and/or docking surfaces identified in the image data by the control system. At 1125, user input is received by the control system identifying a selected region of the display. In one embodiment, the selected region of the display may be identified by the control system by a selection location on the display. At 1130, a selected docking location is identified based on the selected region of the display, wherein the selected docking location is identified by the control system as one of the available docking locations associated with a selected region of the display. At 1135, the display of the docking area is updated, such as by the control system. In one embodiment, the control display may update the display of the docking area to include a display of the marine vessel docked at the selected docking location.

Figure 12:
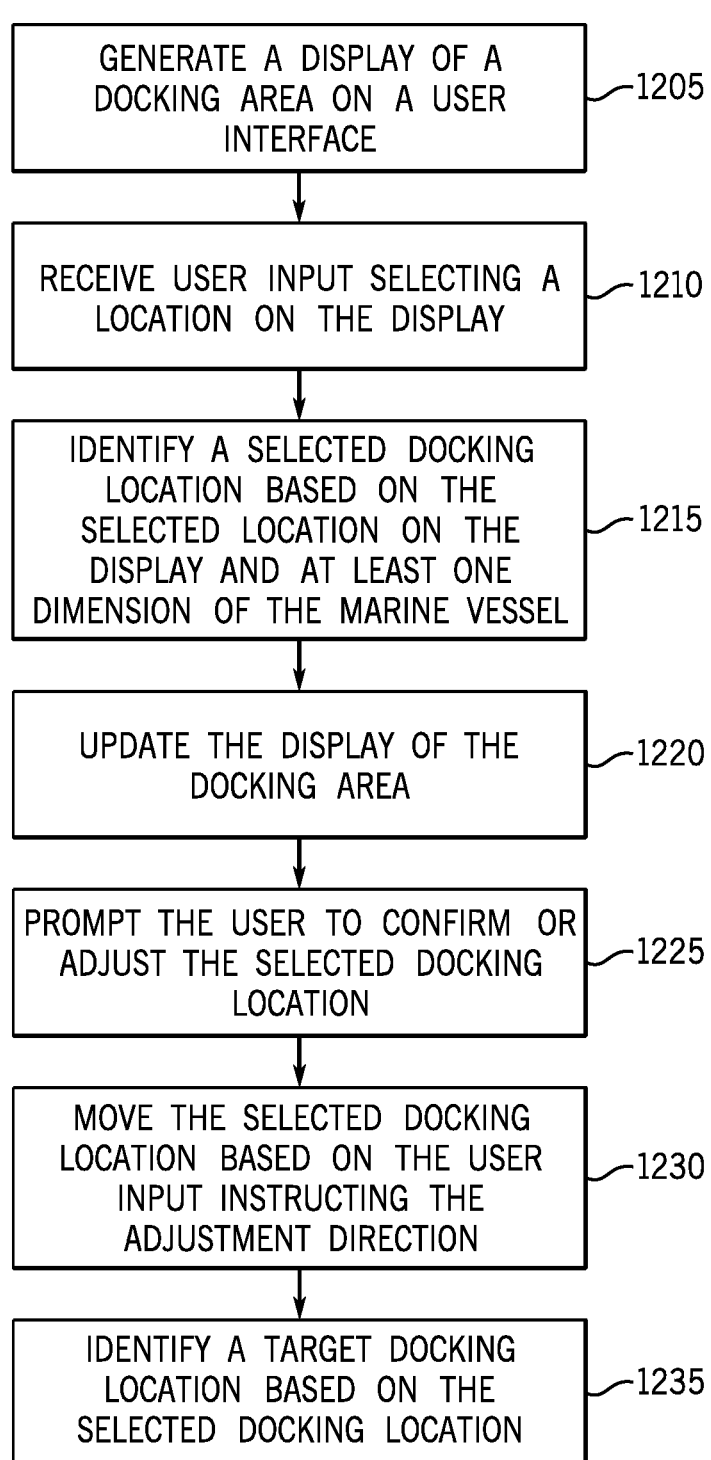

FIG. 12 illustrates an exemplary method for controlling docking. At 1205, a display of a docking area is generated on a user interface, such as by the control system. At 1210, user input is received by the control system, selecting a location on the display. In one embodiment, the user input may be received by the control system from a selected location on the display. At 1215, a selected docking location is identified by the control system based on the selected location on the display and at least one dimension of the marine vessel. In one embodiment, the at least one dimension of the marine vessel may be a selected docking side of the marine vessel, as determined by user input received by the control system or determined from a predetermined or saved setting accessed by the control system from a database stored in memory. In another embodiment, the docking side may be determined by the control system based on the identified of a type of docking surface. At 1220, the display of the docking area is updated by the control system to reflect the selected docking location and the docking orientation.

At 1225, the user is prompted by the control system to confirm or adjust the selected docking location. In one embodiment, adjustment of the selected docking location may be adjusted by one or more direction indicators. In another embodiment, the confirmation of an adjusted position may be received by the control system via a confirmation indicator. At 1230, the selected docking location is moved based on the user input instructing the adjustment direction. In one embodiment, the adjustment direction may be configured to slide the marine vessel on the display along the docking surface, wherein the pixels of display are mapped to the geographical docking surface. In another embodiment, the control system may be configured to allow the marine vessel to be dragged across the display by the center of the icon. In another embodiment, the selected docking location may be moved by a predetermined amount. At 1235, a target docking location is identified by the control system based on the selected docking location. In one embodiment, the selection of the confirmation indicator may confirm a selected docking location as a target docking location.

This written description uses examples to disclose the invention, including the best mode, and to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed.

What is claimed is:

1. A method of controlling docking for a marine vessel, the method comprising:

imaging an area around the marine vessel with an imaging system to generate image data;

generating a display of a docking area on a user interface based on the image data;

receiving a user input selecting a location on the display of the docking area;

identifying a selected docking location based on the selected location on the display and based on at least one dimension of the marine vessel; and updating the display of the docking area to represent the marine vessel docked at the selected docking location.

2. The method of claim 1, further comprising:

identifying at least one available docking location in the docking area based on the image data and the at least one dimension of the marine vessel;

generating the display of the docking area to highlight each of the at least one available docking location for selection by a user;

assigning a region of the display to each of the at least one available docking location;

receiving a user input identifying a selected region of the display; and wherein the selected docking location is the at least one available docking location associated with the selected region of the display.

3. The method of claim 1, wherein identifying the selected docking location includes locating a closest available docking surface to the location on the display selected by the user input.

4. The method of claim 1, further comprising identifying at least one docking surface based on the image data and displaying the at least one docking surface in the display of the docking area, wherein identifying at least one docking surface includes identifying, with a control system, a dock and/or a set of pilings in a straight line based on the image data.

5. The method of claim 1, further comprising identifying at least one docking surface based on the image data and displaying the docking surface in the display of the docking area, wherein identifying the at least one docking surface includes identifying, with a control system, a straight line of at least a threshold length in the image data.

6. The method of claim 5, wherein the threshold length is greater than a length of a docking side of the marine vessel.

7. The method of claim 1, further comprising identifying, with a control system, a dock type, and further comprising:

determining a default vessel orientation based on the dock type; and identifying the selected docking location based further on the default vessel orientation.

8. The method of claim 1, further comprising, upon updating the display of the docking area to represent the marine vessel docked at the selected docking location, prompting a user to confirm or adjust the selected docking location.

9. The method of claim 8, further comprising:

receiving a user input instructing an adjustment direction; and moving the selected docking location in response to receiving the user input instructing the adjustment direction.

10. The method of claim 1, further comprising:

prompting a user to input a clearance distance behind and/or in front of the marine vessel;

identifying the selected docking location based further on the clearance distance.

11. The method of claim 1, further comprising:

prompting a user to select a docking side of the marine vessel;

identifying the selected docking location based further on the selected docking side, wherein the at least one dimension of the marine vessel is a length of the selected docking side.

12. The method of claim 1, further comprising:

identifying a target docking location to dock the marine vessel based on the selected docking location;

automatically controlling at least one marine drive on the marine vessel to move the marine vessel toward the target docking location.

13. A docking system for a marine vessel, the system comprising:

an imaging system configured to image an area around the marine vessel to generate image data;

a control system configured to:

generate a display of a docking area on a user interface based on the image data;

receive a user input selecting a location on the display of the docking area;

identify a selected docking location based on the selected location on the display and based on at least one dimension of the marine vessel; and update the display of the docking area to represent the marine vessel docked at the selected docking location.

14. The system of claim 13, wherein the control system is further configured to:

identify at least one available docking location in the docking area based on the image data;

generate the display of the docking area to highlight each of the at least one available docking location for selection by a user;

assign a region of the display to each of the at least one available docking location;

receive a user input identifying a selected region of the display; and wherein the selected docking location is the at least one available docking location associated with the selected region of the display.

15. The system of claim 13, wherein the control system is further configured to identify the selected docking location by locating a closest available docking surface to the location on the display selected by the user input, and wherein the selected docking location is adjacent to the closest available docking surface.

16. The system of claim 13, wherein the control system is further configured to identify at least one docking surface by identifying a straight line of at least a threshold length based the image data, wherein the threshold length is greater than a length of a docking side of the marine vessel.

17. The system of claim 16, wherein the control system is further configured to:

identify at least one docking surface based on the image data;

identify a dock type based on the image data for each identified docking surface;

determine a default vessel orientation based on the dock type; and identify the selected docking location based further on the default vessel orientation.

18. The system of claim 13, wherein the control system is further configured to, upon updating the display of the docking area to represent the marine vessel docked at the selected docking location, prompt a user to confirm or adjust the selected docking location.

19. The system of claim 13, wherein the control system is further configured to: receive a user input instructing an adjustment direction; and in response to receiving the user input instructing the adjustment direction, move the selected docking location based on the user input instructing the adjustment direction.

20. The system of claim 13, wherein the control system is further configured to:

prompt a user to input a clearance distance behind and/or in front of the marine vessel and/or prompt the user to select a docking side of the marine vessel;

identify the selected docking location based further on the clearance distance and/or identify the selected docking location based further on the selected docking side, wherein the at least one dimension of the marine vessel is a length of the selected docking side.

\* \* \* \* \*